United States Patent
Yata et al.

(10) Patent No.: US 9,947,268 B2
(45) Date of Patent: Apr. 17, 2018

(54) DISPLAY DEVICE AND COLOR CONVERSION METHOD

(71) Applicant: Japan Display Inc., Tokyo (JP)

(72) Inventors: Tatsuya Yata, Tokyo (JP); Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 121 days.

(21) Appl. No.: 14/518,672

(22) Filed: Oct. 20, 2014

(65) Prior Publication Data
US 2015/0109325 A1    Apr. 23, 2015

(30) Foreign Application Priority Data

Oct. 22, 2013  (JP) .................................. 2013-219698
Oct. 17, 2014  (JP) .................................. 2014-213103

(51) Int. Cl.
*G09G 3/3233*  (2016.01)
*H04N 5/57*    (2006.01)
(Continued)

(52) U.S. Cl.
CPC ............. *G09G 3/3233* (2013.01); *G09G 5/02* (2013.01); *G09G 2300/0452* (2013.01);
(Continued)

(58) Field of Classification Search
None
See application file for complete search history.

(56) References Cited

U.S. PATENT DOCUMENTS

| 6,885,380 B1 | 4/2005 | Primerano et al. | |
| 2007/0115392 A1* | 5/2007 | Masuda | H04N 5/20 348/678 |

(Continued)

FOREIGN PATENT DOCUMENTS

| JP | 2007-514184 A | 5/2007 |
| JP | 2009-520241 A | 5/2009 |
| JP | 2010-072353 A | 4/2010 |
| JP | 2011-166485 A | 8/2011 |
| KR | 2007-0116618 A | 12/2007 |
| KR | 2008-0058236 A | 6/2008 |

OTHER PUBLICATIONS

Korean Office Action dated Jul. 13, 2015 for corresponding Korean Application No. 10-2014-0142469.
Japanese Office Action dated Jan. 30, 2018, for corresponding Japanese Patent Application No. 2014-213103.

*Primary Examiner* — Matthew Salvucci
(74) *Attorney, Agent, or Firm* — Michael Best & Friedrich LLP

(57) ABSTRACT

The display device includes an image display unit including a plurality of pixels each including first to third sub-pixels and a fourth sub-pixel for displaying an additional color component according to an amount of lighting of a self-emitting element; a conversion processing unit that receives a first input signal including first color information for display at a predetermined pixel, where the first input signal is obtained based on an input video signal, the conversion processing unit being configured to outputs a second input signal including second color information with a saturation reduced by an amount of saturation attenuation defined such that saturation variation falls within a predetermined range according to the first color information; and a fourth sub-pixel signal processing unit that outputs, to the image display unit, a third input signal including third color information with red, green, blue components and the additional color component that are converted based on the second color information.

10 Claims, 22 Drawing Sheets

(51) Int. Cl.
*H04N 9/73* (2006.01)
*G09G 5/02* (2006.01)

(52) U.S. Cl.
CPC . *G09G 2320/04* (2013.01); *G09G 2340/0457* (2013.01); *G09G 2340/06* (2013.01); *H04N 5/57* (2013.01); *H04N 9/73* (2013.01)

(56) References Cited

U.S. PATENT DOCUMENTS

| | | | |
|---|---|---|---|
| 2007/0139437 A1 | 6/2007 | Boroson et al. | |
| 2010/0020242 A1* | 1/2010 | Lammers | G09G 5/02 348/642 |
| 2010/0123651 A1* | 5/2010 | Miller | G09G 3/3208 345/77 |
| 2010/0225673 A1* | 9/2010 | Miller | G09G 3/2003 345/690 |

* cited by examiner

DISPLAY DEVICE AND COLOR CONVERSION METHOD

CROSS-REFERENCE TO RELATED APPLICATIONS

The present application claims priority to and incorporates by reference the entire contents of Japanese Patent Application No. 2013-219698 filed in Japan on Oct. 22, 2013 and Japanese Patent Application No. 2014-213103 filed in Japan on Oct. 17, 2014.

BACKGROUND OF THE INVENTION

1. Field of the Invention

The present disclosure relates to a display device, an electronic apparatus, and a color conversion method.

2. Description of the Related Art

Conventionally, a liquid crystal display device with an RGBW-type liquid crystal panel that is provided with pixels W (white) in addition to pixels R (red), G (green), and B (blue) has been employed. The RGBW-type liquid crystal display device displays images while allocating, to the pixels W, transmission amounts of light from a backlight through the pixels R, G, and B based on RGB data that determines display of images, thereby making it possible to reduce luminance of the backlight and thus reduce power consumption.

In addition to the liquid crystal display device, an image display panel that lights self-emitting elements, such as organic light-emitting diodes (OLEDs), has been known. For example, Japanese Translation of PCT International Application Publication No. 2007-514184 (JP-T-2007-514184) describes a method of converting a three-color input signal (R, G, B) corresponding to three color-gamut defining primary colors to a four-color output signal (R', G', B', W) corresponding to the color-gamut defining primary colors and one additional primary color W in order to drive a display device including light-emitting elements that emit light corresponding to the four-color output signal.

In the display device including the image display panel that lights the self-emitting elements, a backlight is not needed and the amount of power of the display device is determined according to the amounts of lighting of the self-emitting elements of respective pixels. Therefore, when a conversion process is simply performed by the method described in JP-A-2007-514184, and if the amounts of lighting of the self-emitting elements that emit light for the four-color output signal (R', G', B', W) increase, it may be difficult to reduce power consumption.

For the foregoing reasons, there is a need for a display device, an electronic apparatus, and a color conversion method capable of suppressing power consumption in an image display unit that lights self-emitting elements.

SUMMARY OF THE INVENTION

According to an aspect, a display device includes: an image display unit including a plurality of pixels, each of the pixels including a first sub-pixel for displaying a red component according to an amount of lighting of a self-emitting element; a second sub-pixel for displaying a green component according to an amount of lighting of a self-emitting element; a third sub-pixel for displaying a blue component according to an amount of lighting of a self-emitting element; and a fourth sub-pixel for displaying an additional color component different from the respective components of the first sub-pixel, the second sub-pixel, and the third sub-pixel according to an amount of lighting of a self-emitting element, and having a higher luminance or a higher power efficiency to display the additional color component as compared to representation with the first sub-pixel, the second sub-pixel, and the third sub-pixel; a conversion processing unit configured to receive a first input signal including first color information for display at a predetermined pixel, where the first input signal is obtained based on an input video signal, and, the conversion processing unit being configured to output a second input signal including second color information in which a saturation of the first color information is reduced by an amount of saturation attenuation defined such that saturation variation falls within a predetermined range according to the first color information; and a fourth sub-pixel signal processing unit configured to output, to a drive circuit that drives the image display unit, a third input signal including third color information with the red component, the green component, the blue component, and the additional color component that are converted based on the second color information in the second input signal.

According to another aspect, a color conversion method on an input signal supplied to a drive circuit of an image display unit is provided. The image display unit includes a plurality of pixels, each of the pixels including: a first sub-pixel for displaying a red component according to an amount of lighting of a self-emitting element; a second sub-pixel for displaying a green component according to an amount of lighting of a self-emitting element; a third sub-pixel for displaying a blue component according to an amount of lighting of a self-emitting element; and a fourth sub-pixel for displaying an additional color component different from the respective components of the first sub-pixel, the second sub-pixel, and the third sub-pixel according to an amount of lighting of a self-emitting element, and having a higher luminance or a higher power efficiency to display the additional color component as compared to representation with the first sub-pixel, the second sub-pixel, and the third sub-pixel. The color conversion method includes: receiving a first input signal including first color information that is obtained based on an input video signal and that is for displaying at a predetermined pixel; outputting a second input signal including second color information in which a saturation of the first color information is reduced by an amount of saturation attenuation defined such that saturation variation falls within a predetermined range according to the first color information; and outputting, to the image display unit, a third input signal including third color information with the red component, the green component, the blue component, and the additional color component that are converted based on the second color information in the second input signal.

DETAILED DESCRIPTION OF THE PREFERRED EMBODIMENTS

Figure 1:
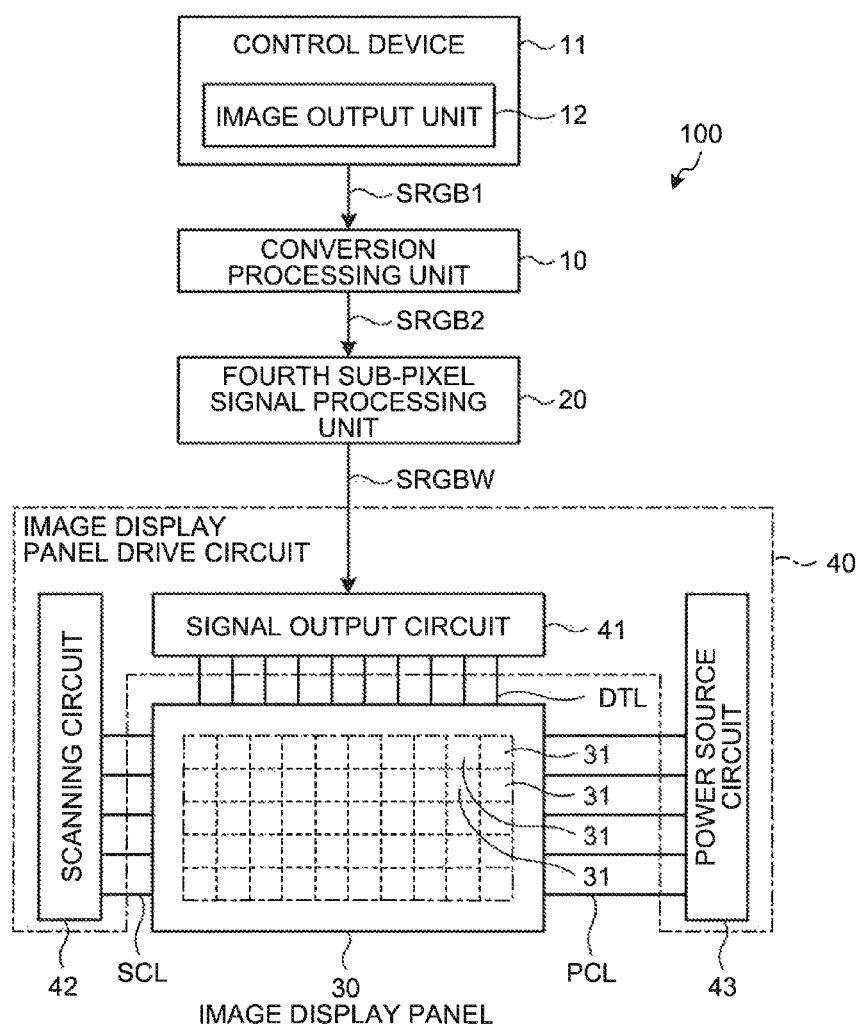
FIG. 1 is a block diagram illustrating an example of a configuration of a display device according to an embodiment.

Exemplary embodiments for carrying out the present disclosure will be described in detail below with reference to the accompanying drawings. The present disclosure is not limited to the contents described in the following embodiments. Each component described below includes those which can be easily conceived by persons skilled in the art and those which are substantially equivalent. Further, the components described below may be combined appropriately. The disclosure herein is presented by way of example only, and the appended claims are to be construed as embodying appropriate modifications that may easily occur to persons skilled in the art within the basic teaching herein set forth. Further, in the drawings, a width, a thickness, a form, and the like of each component may be schematic as compared to actual embodiments, but this is done for simplicity of explanation and by way of example, and the present invention is not thus limited. Furthermore, the same components described in different embodiments and drawings may be denoted by the same reference numerals and symbols and detailed explanation thereof may be omitted appropriately.

Configuration of Display Device

Figure 2:
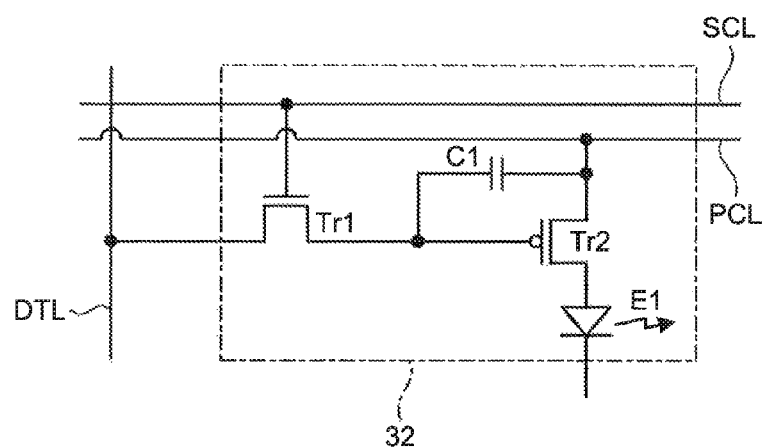
FIG. 2 is a diagram illustrating a lighting drive circuit of a sub-pixel included in a pixel of an image display unit according to the embodiment.
Figure 3:
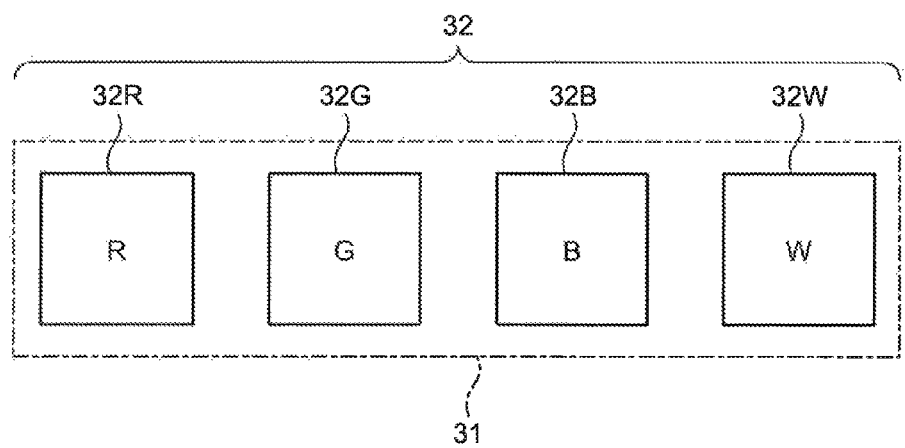
FIG. 3 is a diagram illustrating arrangement of sub-pixels of the image display unit according to the embodiment.
Figure 4:
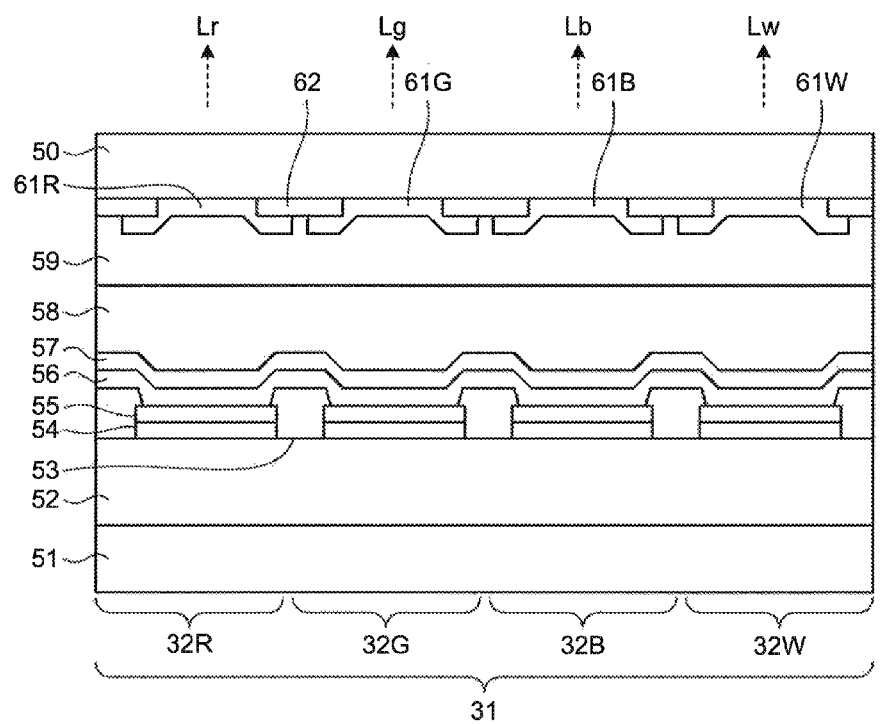
FIG. 4 is a cross-sectional view for explaining a structure of the image display unit according to the embodiment.
Figure 5:
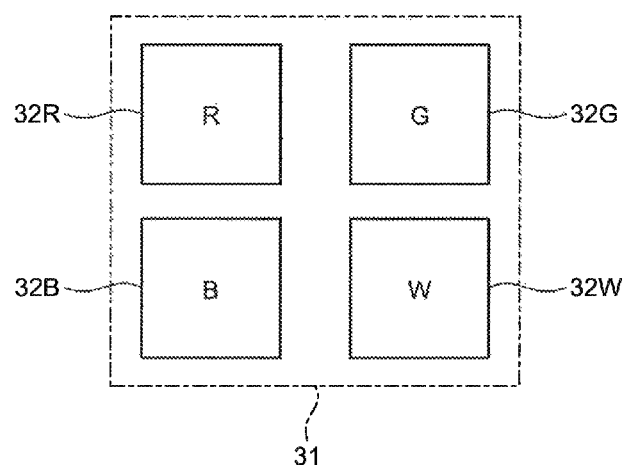
FIG. 5 is a diagram illustrating arrangement of the sub-pixels of the image display unit according to the embodiment.

FIG. 1 is a block diagram illustrating an example of a configuration of a display device according to an embodiment. FIG. 2 is a diagram illustrating a lighting drive circuit of a sub-pixel included in a pixel of an image display unit according to the embodiment. FIG. 3 is a diagram illustrating arrangement of sub-pixels of the image display unit according to the embodiment. FIG. 4 is a cross-sectional view for explaining a structure of the image display unit according to the embodiment. FIG. 5 is a diagram illustrating arrangement of the sub-pixels of the image display unit according to the embodiment.

As illustrated in FIG. 1, a display device 100 includes a conversion processing unit 10, a fourth sub-pixel signal processing unit 20, an image display unit 30 that is an image display panel, and an image display panel drive circuit 40 (hereinafter, also referred to as the drive circuit 40) that controls drive of the image display unit 30. The functions of the conversion processing unit 10 and the fourth sub-pixel signal processing unit 20 may be implemented by, but not limited to, hardware and/or software. When circuits of each of the conversion processing unit 10 and the fourth sub-pixel signal processing unit 20 are configured by hardware, the circuits need not be physically distinguished and isolated from each other, and a plurality of functions may be implemented by a physically single circuit.

The conversion processing unit 10 receives a first input signal SRGB1 including first color information that is obtained based on an input video signal from an image output unit 12 of a control device 11 and that is used for display at a predetermined pixel. The conversion processing unit 10 outputs a second input signal SRGB2, in which the first color information that is an input value in an HSV color space is converted to second color information such that a saturation is reduced by an amount of saturation attenuation within a range of saturation variation acceptable to a human being. Each of the first color information and the second color information is a three-color input signal (R, G, B) including a red component (R), a green component (G), and a blue component (B).

The fourth sub-pixel signal processing unit 20 is coupled to the image display panel drive circuit 40 that drives the image display unit 30. For example, the fourth sub-pixel signal processing unit 20 converts an input value of an input signal (the second input signal SRGB2) in the input HSV color space to a reproduced value (a third input signal SRGBW) in the HSV color space reproduced with a first color, a second color, a third color, and a fourth color to generate an output signal, and outputs the generated output signal to the image display unit 30. In this manner, the fourth sub-pixel signal processing unit 20 outputs, to the drive circuit 40, the third input signal SRGBW including third color information with a red component (R), a green component (G), a blue component (B), and an additional color component such as a white component (W) that are converted based on the second color information in the second input signal SRGB2. The third color information is a four-color input signal (R, G, B, W). While an example will be described in which the additional color component is a white component of so-called pure white represented by (R, G, B)=(255, 255, 255) assuming that each of the red component (R), the green component (G), and the blue component (B) has 256 gradations, the embodiment is not thus limited. For example, it may be possible to perform conversion to the additional color component such as a fourth sub-pixel with a color component represented by (R, G, B)=(255, 230, 204).

In the embodiment, a process of converting an input signal (for example, RGB) to the HSV space is described above as an example of the conversion process; however, the embodiment is not thus limited, and other coordinate systems, such as an XYZ space and a YUV space, may be employed. A color gamut of sRGB or Adobe (registered trademark) RGB, which is a color gamut of a display, is represented by a triangular range in the xy chromaticity range of the XYZ color system; however, a predetermined color space that defines a specific color gamut is not limited to those defined by the triangular range and may be defined by a range corresponding to an arbitrary shape, such as a polygonal shape.

The fourth sub-pixel signal processing unit 20 outputs the generated output signal to the image display panel drive circuit 40. The drive circuit 40 is a control device of the image display unit 30 and includes a signal output circuit 41, a scanning circuit 42, and a power source circuit 43. The drive circuit 40 of the image display unit 30 holds, by the signal output circuit 41, the third input signal SRGBW including the third color information, and sequentially outputs the signal to each of pixels 31 of the image display unit 30. The signal output circuit 41 is electrically coupled to the image display unit 30 via a signal line DTL. The drive circuit 40 of the image display unit 30 selects, by the scanning circuit 42, a sub-pixel in the image display unit 30, and controls ON and OFF of a switching element (for example, thin film transistor (TFT)) to control operation of the sub-pixel (light transmittance). The scanning circuit 42 is electrically coupled to the image display unit 30 via a scanning line SCL. The power source circuit 43 supplies power to a self-emitting element of each of the pixels 31 (to be described below) via a power line PCL.

As the display device 100, various modifications described in Japanese Patent No. 3167026, Japanese Patent No. 3805150, Japanese Patent No. 4870358, Japanese Patent Application Laid-open Publication No. 2011-90118, and Japanese Patent Application Laid-open Publication No. 2006-3475 are applicable.

As illustrated in FIG. 1, the image display unit 30 includes the pixels 31, which are $P_0 \times Q_0$ pixels ($P_0$ pixels in the row direction and $Q_0$ pixels in the column direction) arrayed in a two-dimensional matrix form (matrix array).

Each of the pixels 31 includes a plurality of sub-pixels 32, and lighting drive circuits of the respective sub-pixels 32 illustrated in FIG. 2 are arrayed in a two-dimensional matrix form (matrix array). The lighting drive circuit includes a control transistor Tr1, a drive transistor Tr2, and a charge storage capacitor C1. A gate, a source, and a drain of the control transistor Tr1 are coupled to the scanning line SCL, the signal line DTL, and a gate of the drive transistor Tr2, respectively. One end of the charge storage capacitor C1 is coupled to the gate of the drive transistor Tr2 and the other end is coupled to a source of the drive transistor Tr2. The source of the drive transistor Tr2 is coupled to the power line PCL, and a drain of the drive transistor Tr2 is coupled to an anode of an organic light-emitting diode E1 that is a self-emitting element. A cathode of the organic light-emitting diode E1 is coupled to, for example, a reference potential point (for example, ground).

In FIG. 2, an example is illustrated in which the control transistor Tr1 is an n-channel transistor and the drive transistor Tr2 is a p-channel transistor; however, the polarities of the transistors are not thus limited. The polarities of the control transistor Tr1 and the drive transistor Tr2 may be determined as appropriate.

As illustrated in FIG. 3, each of the pixels 31 includes, for example, a first sub-pixel 32R, a second sub-pixel 32G, a third sub-pixel 32B, and a fourth sub-pixel 32W. The first sub-pixel 32R displays a first primary color (for example, a red-color (R) component). The second sub-pixel 32G displays a second primary color (for example, a green-color (G) component). The third sub-pixel 32B displays a third primary color (for example, a blue-color (B) component). The fourth sub-pixel 32W displays, as an additional color component, a fourth color (specifically, white color) different from the first primary color, the second primary color, and the third primary color. In the following, the first sub-pixel 32R, the second sub-pixel 32G, the third sub-pixel 32B, and the fourth sub-pixel 32W may be referred to as the sub-pixels 32 when they need not be distinguished from one another.

The image display unit 30 includes a substrate 51, insulating layers 52, 53, a reflecting layer 54, a lower electrode 55, a self-emitting layer 56, an upper electrode 57, an insulating layer 58, an insulating layer 59, color filters 61R, 61G, 61B, 61W as color conversion layers, a black matrix 62 as a shielding layer, and a substrate 50 (see FIG. 4). The substrate 51 may be a semiconductor substrate made of silicon or the like, a glass substrate, a resin substrate, or the like. The above described lighting drive circuit or the like is formed or mounted on the substrate 51. The insulating layer 52 is a protection layer for protecting the above described lighting drive circuit or the like, and may be made of silicon oxide, silicon nitride, or the like. The lower electrode 55 is provided at each of the first sub-pixel 32R, the second sub-pixel 32G, the third sub-pixel 32B, and the fourth sub-pixel 32W, and is a conductor that serves as the anode (positive electrode) of the above described organic light-emitting diode E1. The upper electrode 55 is a transparent electrode made of a transparent conductive material (transparent conductive oxide), such as Indium Tin Oxide (ITO). The insulating layer 53 is an insulating layer called a bank that partitions the first sub-pixel 32R, the second sub-pixel 32G, the third sub-pixel 32B, and the fourth sub-pixel 32W from one another. The reflecting layer 54 is made of a shiny metal material, such as silver, aluminum, or gold, which can reflect light emitted from the self-emitting layer 56. The self-emitting layer 56 includes an organic material, and includes a hole injection layer, a hole transport layer, a light-emitting layer, an electron transport layer, and an electron injection layer (not illustrated).

Hole Transport Layer

As a layer for generating holes, it is preferable to employ, for example, a layer containing an aromatic amine compound and a substance with electron acceptability to the aromatic amine compound. The aromatic amine compound is a substance having an arylamine skeleton. Among the aromatic amine compounds, an aromatic amine compound containing triphenylamine in the skeleton and having a molecular weight of 400 or greater is much preferable. Among the aromatic amine compounds containing triphenylamine in the skeletons, an aromatic amine compound containing condensed aromatic ring, such as naphthyl, in the skeleton is much preferable. With use of the aromatic amine compound containing triphenylamine and condensed aromatic ring, it becomes possible to improve heat resistance of a self-emitting element. Examples of the aromatic amine compound include, but are not limited to, 4-4'-bis[N-(1-naphthyl)-N-phenylamino]biphenyl (i.e., α-NPD), 4-4'-bis[N-(3-methylphenyl)-N-phenylamino]biphenyl (i.e., TPD), 4,4',4''-tris(N,N-diphenylamino)triphenylamine (i.e., TDATA), 4,4',4''-tris[N-(3-methylphenyl)-N-phenylamino)triphenylamine (i.e., MTDATA), 4-4'-bis[N-{4-(N, N-di-m-tolylamino)phenyl}-N-phenylamino]biphenyl (i.e., DNTPD), 1,3,5-tris[N, N-di(m-tolyl)-animo]benzene (i.e., m-MTDAB), 4,4'4''-tris(N-carbazolyl)triphenylamine (i.e., TCTA), 2-3-bis(4-diphenylaminophenyl) quinoxaline (i.e., TPAQn), 2,2',3,3''-tetrakis(4-diphenylaminophenyl)-6,6'-bisquinoxaline (i.e., D-TriPhAQn), and 2-3-bis{4-[N-(1-naphthyl)-N-phenylamino]phenyl}-dibenzo[f,h]quinoxaline (i.e., NPADiBzQn). The substance with the electron acceptability to the aromatic amine compound is not specifically limited, and examples thereof include, but are not limited to, molybdenum oxide, vanadium oxide, 7,7,8,8-tetracyanoquinodimethane (TCNQ), and 2,3,5,6-tetrafluoro-7,7,8,8-tetracyanoquinodimethane (F4-TCNQ).

Electron Injection Layer and Electron Transport Layer

An electron transport substance is not specifically limited, and examples thereof include, but are not limited to, metal complex, such as tris(8-hydroxyquinolinato)aluminum (i.e., $Alq_3$), tris(4-methyl-8-hydroxyquinolinato)aluminum (i.e., $Almq_3$), bis(2-hydroxybenzo[h]quinolinato)beryllium (i.e., $BeBq_2$), bis(2-methyl-8-hydroxyquinolinato)-4-phenylphenolato-aluminum (i.e., BAlq), bis[2-(2-hydroxyphenyl)benzoxazolato]zinc ($Zn(BOX)_2$), or bis[2-(2-hydroxyphenyl)benzothiazolate]zinc ($Zn(BTZ)_2$), as well as 2-(4-biphenyl)-5-(4-tert-butylphenyl)-1,3,4-oxydiazole (i.e., PBD), 1,3-bis[5-(p-tert-butylphenyl)-1,3,4-oxydiazole-2-yl]benzene (i.e., OXD-7), 3-(4-tert-butylphenyl)-4-phenyl-5-(4-biphenylyl)-1,2,4-triazole (i.e., TAZ), 3-(4-tert-butylphenyl)-4-(4-ethylphenyl)-5-(4-biphenylyl)-1,2,4-triazole (i.e., p-EtTAZ), bathophenanthroline (i.e., BPhen), and bathocuproin (i.e., BCP). A substance with electron-donating ability to the electron transport substance is not specifically limited, and examples thereof include, but are not limited to, alkali metal, such as lithium or cesium; alkali earth metal, such as magnesium or calcium; and rare earth metal, such as erbium or ytterbium. It may be possible to employ, as the substance with the electron-donating ability to the electron transport substance, a substance selected from alkali metal oxide such as lithium oxide ($Li_2O$) or alkali earth metal oxide such as calcium oxide (CaO), sodium oxide ($Na_2O$), potassium oxide ($K_2O$), or magnesium oxide (MgO).

Light-Emitting Layer

To obtain, for example, reddish light, it may be possible to employ a substance having an emission spectrum with a peak at 600 nm to 680 nm. Examples of such a substance include, but are not limited to, 4-dicyanomethylene-2-isopropyl-6-[2-(1,1,7,7-tetramethyljulolidine-9-yl)ethenyl]-4H-pyran (i.e., DCJTI), 4-dicyanomethylene-2-methyl-6-[2-(1,1,7,7-tetramethyljulolidine-9-yl)ethenyl]-4H-pyran (i.e., DCJT), 4-dicyanomethylene-2-tert-butyl-6-[2-(1,1,7,7-tetramethyljulolidine-9-yl)ethenyl]-4H-pyran (i.e., DCJTB), periflanthene, and 2,5-dicyano-1,4-bis[2-(10-methoxy-1,1,7,7-tetramethyljulolidine-9-yl)ethenyl]benzene. To obtain greenish light, it may be possible to employ a substance having an emission spectrum with a peak at 500 nm to 550 nm. Examples of such a substance include, but are not limited to, N,N'-dimethylquinacridone (i.e., DMQd), coumalin6, coumalin545T, and tris(8-hydroxyquinolinato)aluminum (i.e., $Alq_3$). To obtain bluish light, it may be possible to employ a substance having an emission spectrum with a peak at 420 nm to 500 nm. Examples of such a substance include, but are not limited to, 9,10-bis(2-naphthyl)-tert-butylanthracene (i.e., t-BuDNA), 9,9'-bianthryl, 9,10-diphenylanthracene (i.e., DPA), 9,10-bis(2-naphthyl)anthracene (i.e., DNA), bis(2-methyl-8-hydroxyquinolinato)-4-phenylphenolato-gallium (i.e., BGaq), and bis(2-methyl-8-hydroxyquinolinato)-4-phenylphenolato-aluminum (i.e., BAlq). Other than the substance that emits fluorescence as described above, a substance that emits phosphorescence may be employed as the light-emitting substance. Examples of such a substance include, but are not limited to, bis[2-(3,5-bis(trifluoromethyl)phenyl)pyridinato-N,C2']iridium (III)picolinate (i.e., $Ir(CF_3ppy)_2(pic)$), bis[2-(4,6-difluorophenyl)pyridinato-N,C2']iridium(III)acetylacetonate (i.e., FIr(acac)), bis[2-(4,6-difluorophenyl)pyridinato-N,C2'] iridium(III)picolinate (i.e., FIr(pic)), and tris(2-phenylpyridinato-N,C2')iridium (i.e., $Ir(ppy)_3$).

The upper electrode 57 is a transparent electrode made of a transparent conductive material (transparent conductive oxide), such as Indium Tin Oxide (ITO). In the embodiment, ITO is described as an example of the transparent conductive material; however, the embodiment is not thus limited. As the transparent conductive material, a conductive material with different composition, such as Indium Zin Oxide (IZO), may be used. The upper electrode 57 serves as the cathode (negative electrode) of the organic light-emitting diode E1. The insulating layer 58 is a sealing layer that seals the above described upper electrode 57, and may be made of silicon oxide, silicon nitride, or the like. The insulating layer 59 is a planarizing layer that suppresses steps formed by the bank, and may be made of silicon oxide, silicon nitride, or the like. The substrate 50 is a transparent substrate that protects the entire image display unit 30, and may be, for example, a glass substrate.

In FIG. 4, an example is illustrated in which the lower electrode 55 serves as the anode (positive electrode) and the upper electrode 57 serves as the cathode (negative electrode); however, the embodiment is not thus limited. The lower electrode 55 may serve as the cathode and the upper electrode 57 may serve as the anode, and in this case, it is possible to appropriately change the polarity of the drive transistor Tr2 electrically coupled to the lower electrode 55, and it is also possible to appropriately change the stacking order of the carrier injection layer (the hole injection layer and the electron injection layer), the carrier transport layer (the hole transport layer and the electron transport layer), and the light-emitting layer.

The image display unit 30 is a color display panel, and includes, as illustrated in FIG. 4, the first color filter 61R arranged between the first sub-pixel 32R and an image observer in order to transmit first primary color light Lr among light-emitting components of the self-emitting layer 56. The image display unit 30 includes, similarly to the above, the second color filter 61G arranged between the second sub-pixel 32G and the image observer in order to transmit second primary color light Lg among the light-emitting components of the self-emitting layer 56. The image display unit 30 includes, similarly to the above, the third color filter 61B arranged between the third sub-pixel 32B and the image observer in order to transmit third primary color light Lb among the light-emitting components of the self-emitting layer 56. Similarly to the above, the fourth color filter 61W is arranged between the fourth sub-pixel 32W and the image observer in order to transmit a light-emitting component that is adjusted as fourth primary color light Lw among the light-emitting components of the self-emitting layer 56. The image display unit 30 can emit, from the fourth sub-pixel 32W, the fourth primary color light Lw with a color component different from those of the first primary color light Lr, the second primary color light Lg, and the third primary color light Lb. The color filter may not be provided between the fourth sub-pixel 32W and the image observer, and the image display unit 30 may emit, from the fourth sub-pixel 32W, the fourth primary color light Lw with a color component different from those of the first primary color light Lr, the second primary color light Lg, and the third primary color Lb without causing a light-emitting component of the self-emitting layer 56 to pass through a color conversion layer, such as the color filter. For example, the image display unit 30 may include, at the fourth sub-pixel 32W, a transparent resin layer instead of the fourth color filter 61W for color adjustment. If the image display unit 30 includes the transparent resin layer as described above, it becomes possible to prevent large steps from being formed at the fourth sub-pixel 32W.

FIG. 5 is a diagram illustrating arrangement of the sub-pixels of the image display unit according to the embodiment. In the image display unit 30, the pixels 31 are arrayed in a matrix form, in each of which the sub-pixels 32 including the first sub-pixel 32R, the second sub-pixel 32G, the third sub-pixel 32B, and the fourth sub-pixel 32W are combined in a 2-by-2 matrix.

Figure 6:
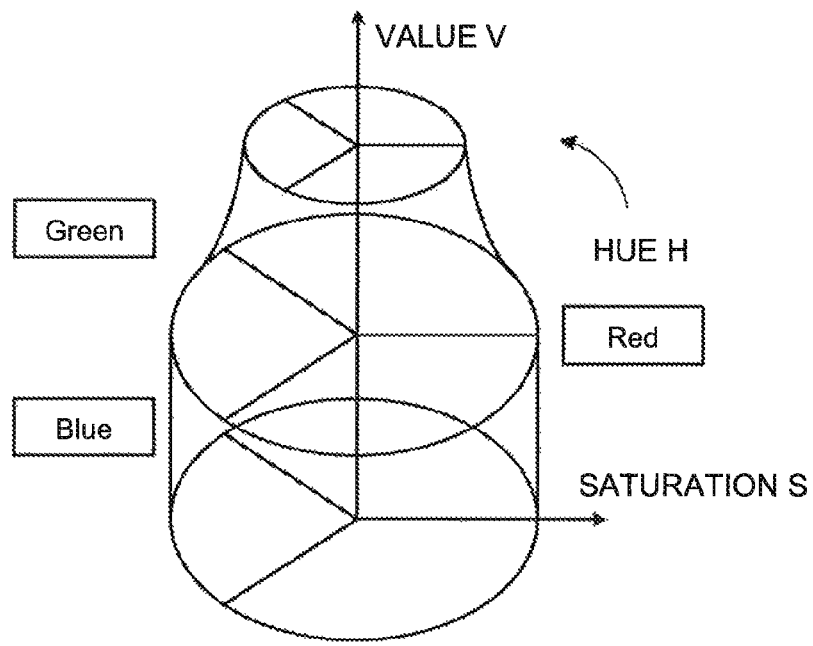
FIG. 6 is a conceptual diagram of an HSV color space that is reproducible by the display device of the embodiment.
Figure 7:
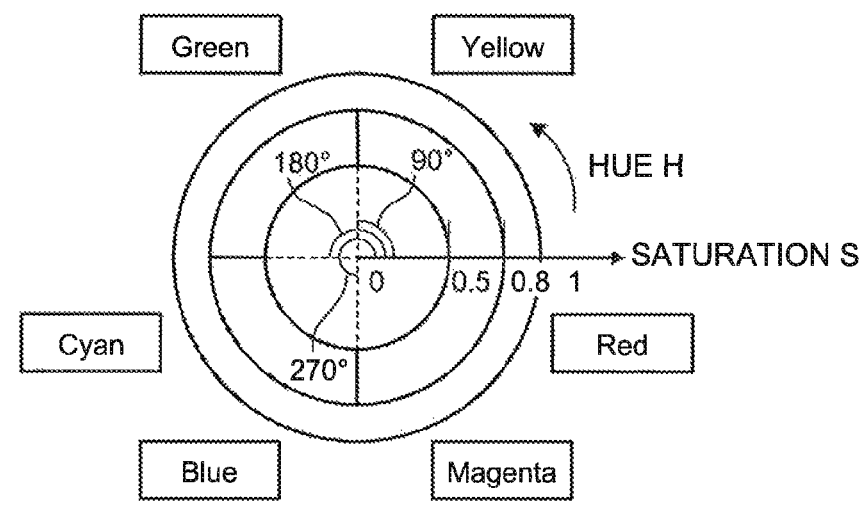
FIG. 7 is a conceptual diagram illustrating a relationship between a hue and a saturation in the HSV color space.

FIG. 6 is a conceptual diagram of the HSV color space that is reproducible by the display device of the embodiment. FIG. 7 is a conceptual diagram illustrating a relationship between a hue and a saturation in the HSV color space. The display device 100 includes, in each of the pixels 31, the fourth sub-pixel 32W for outputting the fourth color (white color); therefore, a dynamic range of the value (also called as brightness) in the HSV color space can be extended as illustrated in FIG. 6. That is, as illustrated in FIG. 6, a certain shape is obtained, in which a substantially trapezoidal solid indicating that the maximum value of a value V increases with an increase in a saturation S is placed on the cylindrical HSV color space that is representable by the first sub-pixel 32R, the second sub-pixel 32G, and the third sub-pixel 32B.

The first input signal SRGB1 includes, as the first color information, input signals of the respective gradations of the red component (R), the green component (G), and the blue component (B), and therefore serves as information on the cylindrical HSV color space, that is, a cylindrical portion of the HSV color space illustrated in FIG. 6.

As illustrated in FIG. 7, a hue H is represented by an angle from zero degree to 360 degrees. Red color (Red), yellow color (Yellow), green color (Green), cyan color (Cyan), blue color (Blue), magenta color (Magenta), and red color are arranged in this order from zero degree to 360 degrees. In the embodiment, a region including the angle of zero degree represents red, a region including the angle of 120 degrees represents green, and a region including the angle of 240 degrees represents blue.

Figure 8:
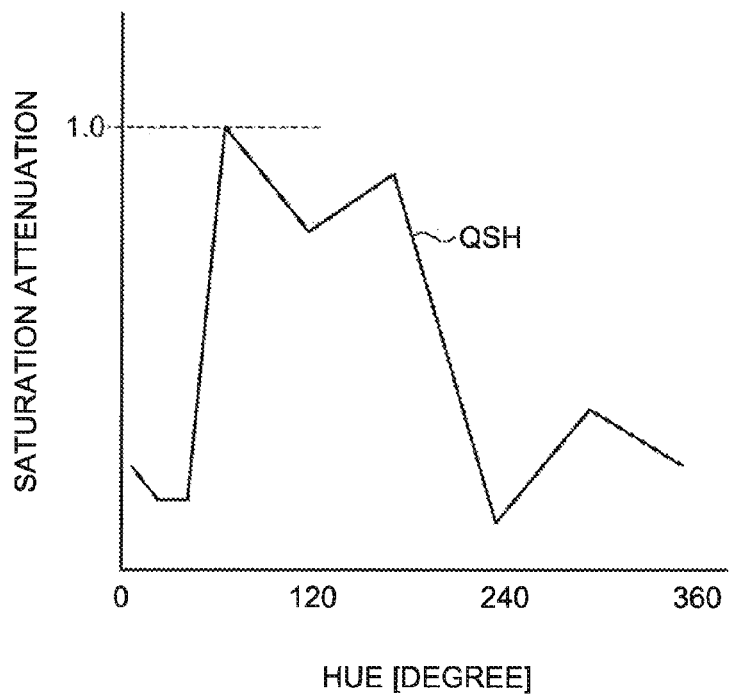
FIG. 8 is an explanatory diagram for explaining a look-up table indicating a relationship between a hue according to the embodiment and an amount of saturation attenuation within a predetermined range defined as a range of acceptable saturation variation.
Figure 9:
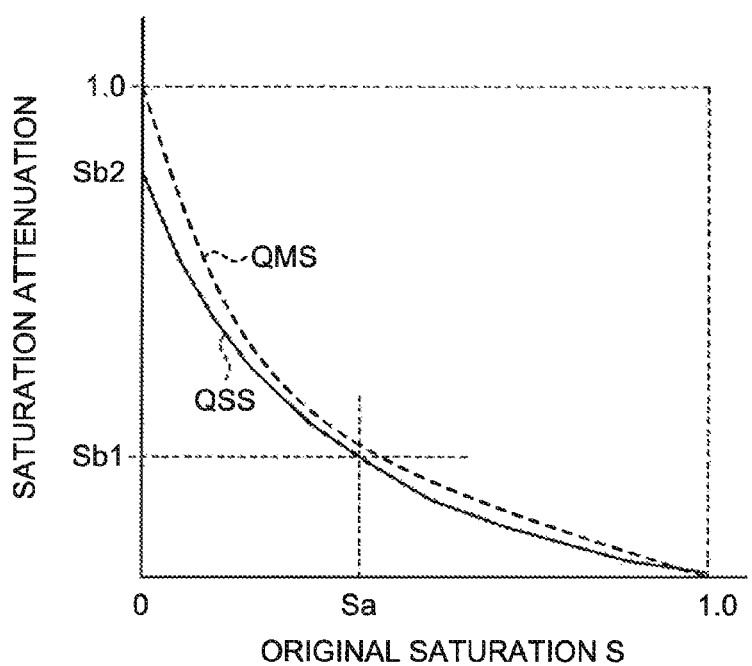
FIG. 9 is an explanatory diagram for explaining a look-up table indicating a relationship between an original saturation before being converted according to the embodiment and an amount of saturation attenuation within a predetermined range defined as a range of acceptable saturation variation.
Figure 10:
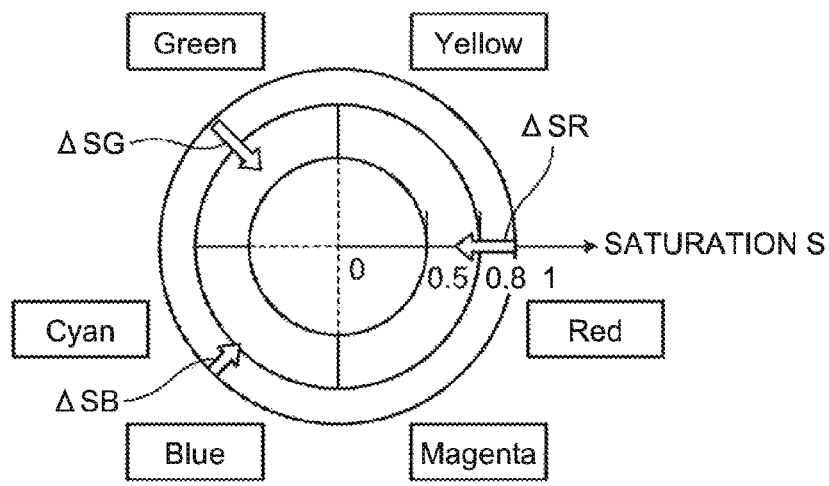
FIG. 10 is a conceptual diagram illustrating the amount of saturation attenuation in the HSV color space according to the embodiment.

FIG. 8 is an explanatory diagram for explaining a look-up table indicating a relationship between a hue according to the embodiment and an amount of saturation attenuation within a predetermined range defined as a range of acceptable saturation variation. FIG. 9 is an explanatory diagram for explaining a look-up table indicating a relationship between an original saturation before being converted according to the embodiment and an amount of saturation attenuation within a predetermined range defined as a range of acceptable saturation variation. FIG. 10 is a conceptual diagram illustrating the amount of saturation attenuation in the HSV color space according to the embodiment. As illustrated in FIG. 8, the amount of saturation attenuation within the range of acceptable saturation variation varies for each hue H. The look-up table illustrated in FIG. 8 is first saturation conversion information, in which a gain value QSH is obtained assuming that the vertical axis represents the amount of saturation attenuation with respect to each hue H. As illustrated in FIG. 8, in the case of either the red component with the hue H in the region including the angle of zero degree and the blue component with the hue H in the region including the angle of 240 degrees, the amount of saturation attenuation within the range of acceptable saturation variation is relatively small, so that the amount of saturation attenuation varied by the conversion processing unit 10 is relatively small.

As illustrated in FIG. 9, the amount of saturation attenuation within the predetermined range defined as the range of acceptable saturation variation varies for each original saturation S. The look-up table illustrated in FIG. 9 is a plot of, as a recognition characteristic curve QMS, a curve of the lower limit value of the amount of saturation attenuation with which the variation in the saturation is recognized, with respect to the original saturation S that is not yet converted by the conversion processing unit 10. The conversion processing unit 10 stores therein, as the first saturation conversion information, an approximate curve QSS below the recognition characteristic curve QMS with respect to the same original saturation S. For example, the approximate curve QSS is stored so as to be below the entire recognition characteristic curve QMS of each of the primary color of the red component, the primary color of the green component, and the primary color of the blue component among the hues H. For example, the approximate curve QSS is stored such that an amount of saturation attenuation Sb1 is obtained when the original saturation S is set to a saturation Sa and an amount of saturation attenuation Sb2 is obtained when the original saturation is set to zero. The approximate curve QSS may be stored as a function or a look-up table. Alternatively, the approximate curve QSS may be sequentially calculated within a range below the recognition characteristic curve QMS. In the following, processing operation performed by the display device 100, the conversion processing unit 10, and the fourth sub-pixel signal processing unit 20 will be described as a first embodiment.

First Embodiment

Figure 11:
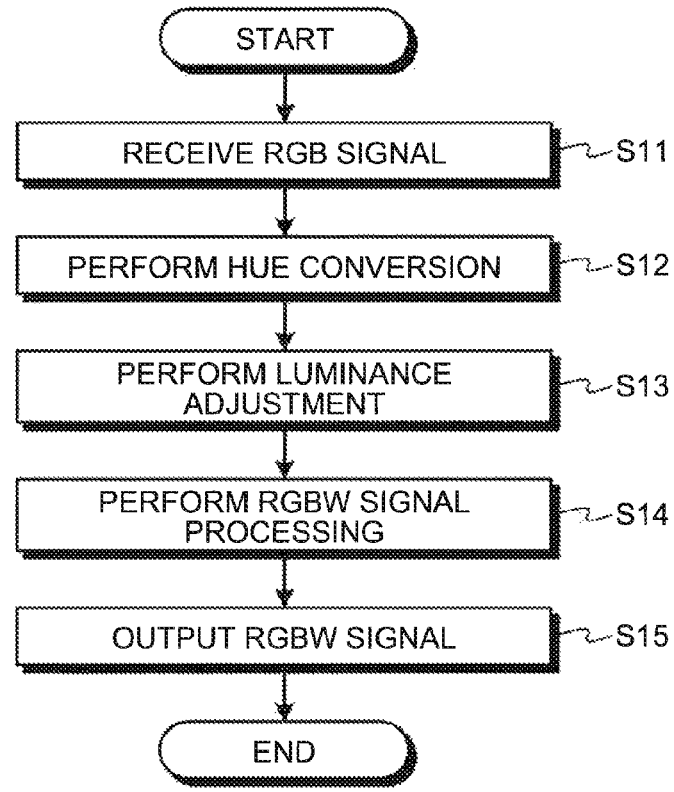
FIG. 11 is a flowchart for explaining a color conversion method according to the first embodiment.

FIG. 11 is a flowchart for explaining a color conversion method according to the first embodiment. As illustrated in FIG. 11, in the color conversion method on an input signal supplied to the image display unit 30, the conversion processing unit 10 receives the first input signal SRGB1 including the first color information that is obtained based on an input video signal and that is used for display at a predetermined pixel (Step S11). The first color information is subjected to gamma conversion as appropriate, and a value in the RGB coordinate system is converted to an input value in the HSV color space.

Subsequently, as illustrated in FIG. 10, the conversion processing unit 10 performs a saturation conversion step of calculating, based on information in the look-up tables in FIG. 8 and FIG. 9, a gain value of the amount of saturation attenuation such that the amount of saturation attenuation can be regulated to any of amounts of saturation attenuation ΔSR, ΔSG, and ΔSB, and multiplying the first color information that is the input value in the HSV color space by the gain value (Step S12). For example, the conversion processing unit 10 employs a gain value that is obtained by multiplying the look-up tables in FIG. 8 and FIG. 9. Accordingly, it becomes possible to obtain a highly accurate gain value for each hue H. For another example, the conversion processing unit 10 employs a gain value that is obtained by adding the look-up tables in FIG. 8 and FIG. 9. Accordingly, it becomes possible to reduce a load on the calculation in the conversion process. As described above, the first sub-pixel 32R displays the red component according to the amount of lighting of the self-emitting element. The second sub-pixel 32G displays the green component according to the amount of lighting of the self-emitting element. The third sub-pixel 32B displays the blue component according to the amount of lighting of the self-emitting element. The fourth sub-pixel 32W has a higher luminance or a higher power efficiency to display the white component (W) as the additional color component as compared to representation with the amount of lighting of the red component (R) displayed by the first sub-pixel 32R, the amount of lighting of the green component (G) displayed by the second sub-pixel 32G, and the amount of lighting of the blue component (B) displayed by the third sub-pixel 32B, and displays the additional color component according to the amount of lighting of the self-emitting element. Therefore, to suppress the power consumption, it is preferable that the saturation of the second color information is shifted toward a color with a greater amount of the white component (W) as compared to the saturation of the first color information.

Figure 12:
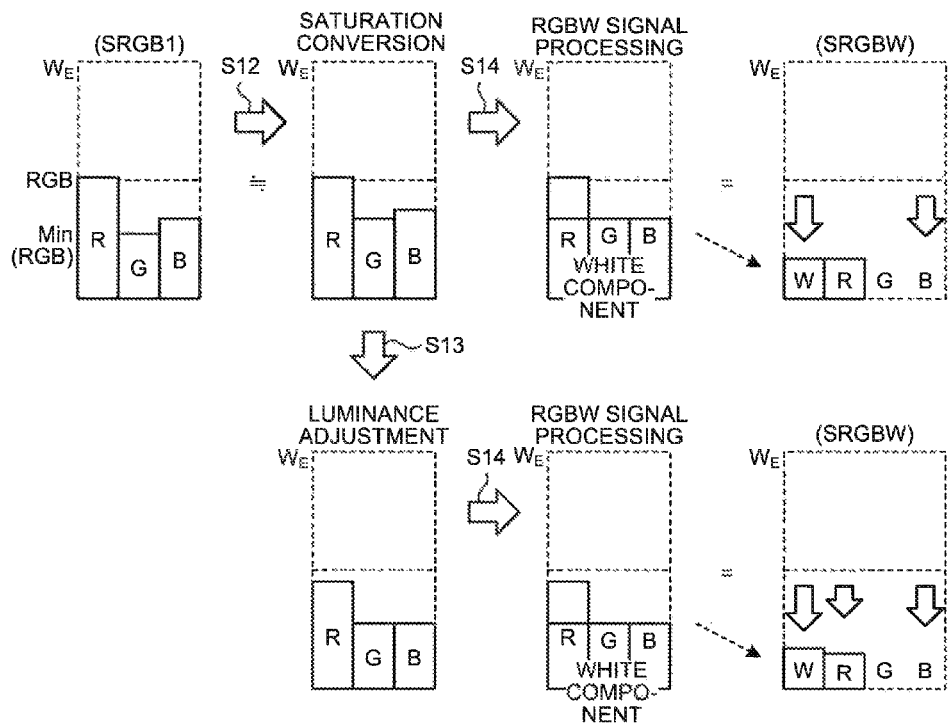
FIG. 12 is a schematic diagram for explaining an example of the color conversion process according to the first embodiment.
Figure 13:
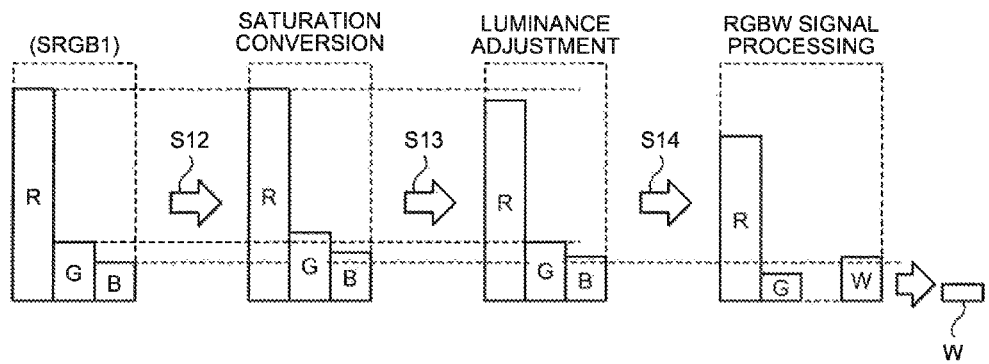
FIG. 13 is a schematic diagram for explaining an example of the color conversion process according to the first embodiment.
Figure 14:
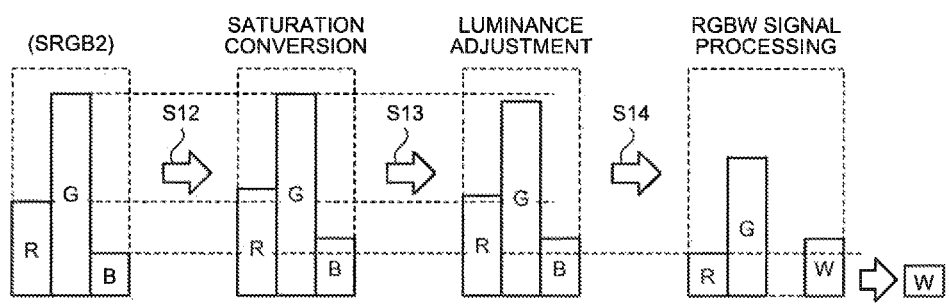
FIG. 14 is a schematic diagram for explaining an example of the color conversion process according to the first embodiment.
Figure 15:
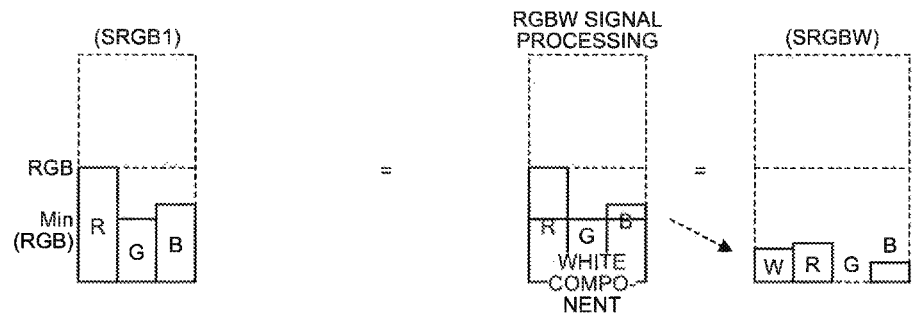
FIG. 15 is a schematic diagram for explaining an example of a color conversion process according to a comparative example.

FIG. 12, FIG. 13, and FIG. 14 are schematic diagrams for explaining an example of a hue conversion process according to the first embodiment. FIG. 15 is a schematic diagram for explaining an example of a color conversion process according to a comparative example. In FIG. 12, FIG. 13, FIG. 14, and FIG. 15, a color space that is displayable with the first sub-pixel 32R, the second sub-pixel 32G, the third sub-pixel 32B, and the fourth sub-pixel 32W is illustrated as a region "$W_E$", in addition to the color space that is displayable with the first sub-pixel 32R, the second sub-pixel 32G, and the third sub-pixel 32B.

For example, as illustrated in FIG. 12, when the first input signal SRGB1 including the first color information is converted to the second input signal SRGB2 including the converted second color information through the saturation conversion step (Step S12), the amount of saturation attenuation ΔSG is calculated such that the green (G) component increases. Accordingly, the amount of the white component with all of the red component, the green component, and the blue component, each being a single color component, increases. When the fourth sub-pixel signal processing unit 20 performs the RGBW signal processing step of performing conversion to a reproduced value (the third input signal SRGBW) in the HSV color space reproduced with the first color, the second color, the third color, and the fourth color to generate an output signal, and outputting the generated signal to the image display unit 30 (S14), the amount of lighting of the red component (R) displayed by the first sub-pixel 32R and the amount of lighting of the additional color component, such as the white component (W) displayed by the fourth sub-pixel 32W correspond to the power consumption of the pixel 31. For example, if a luminance of original data in the first color information is represented by Lr×R+Lg×G+Lb×B, a luminance of the converted data in the second color information is represented by Lr×R'+Lg×G'+Lb×B' through the saturation conversion step (Step S12); therefore, it is possible to calculate a ratio of the luminance and adjust the converted data.

As illustrated in FIG. 15, in an example of the color conversion process according to the comparative example, the RGBW signal processing step (Step S14) is performed without performing the saturation conversion step (Step S12); therefore, the amount of lighting of the red component (R) displayed by the first sub-pixel 32R, the amount of lighting of the blue component (B) displayed by the third sub-pixel 32B, and the amount of lighting of the additional color component such as the white component (W), displayed by the fourth sub-pixel 32W correspond to the power consumption of the pixel 31. As described above, as compared to the process in the comparative example, the color conversion method on an input signal supplied to the image display unit according to the first embodiment can increase the amount of lighting of the additional color component such at the white component, while reducing the amount of lighting of the single color component, enabling to suppress the power consumption of the pixel 31.

Subsequently, as illustrated in FIG. 11, the conversion processing unit 10 performs a luminance adjustment step of performing a calculation to reduce a saturation such that the luminance of the first color information and the luminance of the second color information remain substantially equal to each other (Step S13). For example, as illustrated in FIG. 12, the luminance of the second color information looks higher than the luminance of the first color information after the above described saturation conversion step (Step S12); therefore, the conversion processing unit 10 adjusts the luminance such that the luminance of the first color information and the luminance of the second color information remain substantially equal to each other.

As illustrated in FIG. 12, the level of each of the red component, the green component, and the blue component, each being a single color component, is uniformly reduced through the luminance adjustment process. Therefore, through the RGBW signal processing step (Step S14), the amount of lighting of the red component (R) displayed by the first sub-pixel 32R and the amount of lighting of the additional color component such as the white component (W) displayed by the fourth sub-pixel 32W in the third input signal SRGBW are further reduced.

Subsequently, the fourth sub-pixel signal processing unit 20 performs an output step of outputting, to the drive circuit 40 that controls drive of the image display unit 30, the third input signal SRGBW including the third color information with the red component (R), the green component (G), the blue component (B), and the additional color component such as the white component (W) that are converted based on the second color information in the second input signal SRGB2 (Step S15).

As described above, the conversion processing unit 10 receives the first input signal including the first color information that is used for display at a predetermined pixel, and outputs the second input signal including the second color information in which a saturation is reduced by the amount of saturation attenuation defined such that variation in the saturation falls within a predetermined range according to the first color information. Therefore, the display device 100 attenuates a saturation (an original saturation S) of an original color within a predetermined range defined as a range in which the variation in the saturation is less likely to be noticed, thereby increasing the amount of lighting of the fourth sub-pixel 32W. The saturation (the original saturation S) of the original color is attenuated within a predetermined range defined as a range in which the variation in the saturation is less likely to be noticed, such that the total amount of lighting of the light-emitting elements of the first sub-pixel 32R, the second sub-pixel 32G, the third sub-pixel 32B, and the fourth sub-pixel 32W is reduced; therefore, it is possible to suppress power consumption. Consequently, if the sub-pixels 32 that are not lighted among the first sub-pixel 32R, the second sub-pixel 32G, and the third sub-pixel 32B increase, the power consumption can further be suppressed.

In the image display unit 30, the original saturation S is attenuated such that the luminance of the first color information and the luminance of the second color information remain substantially equal to each other; therefore, degradation of an image is less likely to be recognized by a human being. Consequently, the display device 100 can suppress the entire power consumption while suppressing a decrease (degradation) in the entire display quality.

The conversion processing unit 10 reduces a saturation such that the amount of saturation attenuation varies according to the hue of the first color information. Therefore, the amount of saturation attenuation in a hue region in which a human being can easily distinguish a difference in colors is relatively small, so that degradation of an image is less likely to be recognized by a human being. Consequently, the display device 100 can suppress the entire power consumption while suppressing a decrease (degradation) in the entire display quality.

The conversion processing unit 10 performs a calculation to reduce a saturation by increasing the amount of saturation attenuation with a decrease in the saturation of the first color information. Therefore, the amount of attenuation of a low saturation that is less likely to be distinguished by a human being is large, so that a power reduction effect through the saturation conversion step at Step S12 can be improved. Consequently, the display device 100 can suppress the entire power consumption while suppressing a decrease (degradation) in the entire display quality. The amount of saturation attenuation decreases as the color comes closer to a primary color; therefore, a human being is less likely to distinguish a difference in colors.

According to the embodiment, it is possible to provide a display device and a color conversion method capable of suppressing power consumption in an image display unit that lights self-emitting elements. The display device according to the embodiment and the electronic apparatus and the color conversion method using the display device attenuates a saturation according to a hue and a saturation of an original color within a range in which the variation in the saturation is less likely to be noticed, to thereby increase the amount of lighting of the fourth sub-pixel; therefore, it is possible to suppress power consumption.

First Modification

As a modification of a luminance adjustment step (Step S13), for example, according to the look-up tables illustrated FIG. 8 and FIG. 9, if the hue H of the first input signal SRGB1 (see FIG. 13) is in a region from zero degree to 30 degrees (both inclusive), the amount of reduction in a saturation is suppressed. Therefore, as illustrated in FIG. 13, the conversion processing unit 10 according to the first embodiment reduces the saturation by the amount of saturation attenuation within the range of acceptable saturation variation, and increases the amount of lighting of the light-emitting element of the second sub-pixel 32G. While the luminance after the conversion of the saturation increases, the level of each of the red component, the green component, and the blue component, each being a single color component, is uniformly reduced through the luminance adjustment step (Step S13). Therefore, through the RGBW signal processing step (Step S14), the amount of lighting of the red component (R) displayed by the first sub-pixel 32R and the amount of lighting of the green component (G) displayed by the second sub-pixel 32G in the third input signal SRGBW are further reduced.

The fourth sub-pixel 32W has a higher luminance or a higher power efficiency to display the additional color component such as the white component (W) as compared to representation with the amount of lighting of the red component (R) displayed by the first sub-pixel 32R, the amount of lighting of the green component (G) displayed by the second sub-pixel 32G, and the amount of lighting of the blue component (B) displayed by the third sub-pixel 32B, so that power can further be saved.

Second Modification

As another modification of the luminance adjustment step (Step S13), for example, according to the look-up tables illustrated FIG. 8 and FIG. 9, when the hue H of the first input signal SRGB2 (see FIG. 14) is about 120 degrees, it is possible to increase the amount of reduction in a saturation. Therefore, as illustrated in FIG. 13, the conversion processing unit 10 according to the first embodiment reduces the saturation by the amount of saturation attenuation within the range of acceptable saturation variation, and increases the amount of lighting of the light-emitting element of the second sub-pixel 32G. The luminance after the conversion of the saturation increases and the level of each of the red component and the green component, each being a single color component, increases through the luminance adjustment step (Step S13); however, the RGBW signal processing step (Step S14) enables conversion to the additional color component such as the white component (W) from the red component, the green component, and the blue component to thereby enable conversion toward a lower power side in the case of conversion to power. Consequently, the amount of lighting of the red component (R) displayed by the first sub-pixel 32R and the amount of lighting of the green component (G) displayed by the second sub-pixel 32G in the third input signal SRGBW are further reduced.

The fourth sub-pixel 32W has a higher luminance or a higher power efficiency to display the additional color component such as the white component (W) as compared to representation with the amount of lighting of the red component (R) displayed by the first sub-pixel 32R, the amount of lighting of the green component (G) displayed by the second sub-pixel 32G, and the amount of lighting of the blue component (B) displayed by the third sub-pixel 32B, so that power can further be saved.

According to the first modification and the second modification, if pieces of the first color information in the first input signal SRGB1 (see FIG. 13 and FIG. 14) have, for example, the same saturation, the same value, and different hues, the conversion processing unit 10 performs a calculation to reduce saturations such that the amount of saturation attenuation varies depending on the hue of each piece of the first color information, instead of adding the same amount of color component. Therefore, the display device, the electronic apparatus, and the color conversion method according to the first embodiment are capable of reducing a saturation according to a hue and a saturation of an original color within a range in which a human being is less likely to notice the variation in the saturation, thereby increasing the amount of lighting of the fourth sub-pixel 32W and thus suppressing power consumption.

Third Modification

Figure 16:
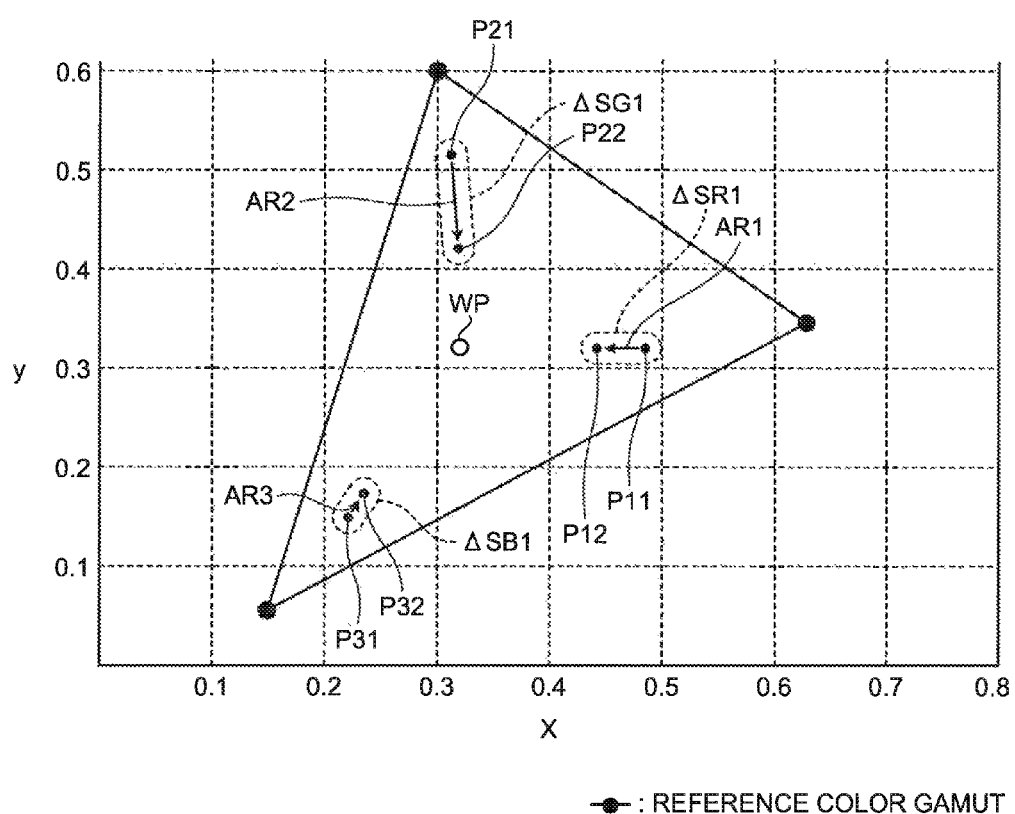
FIG. 16 is an explanatory diagram for explaining an example of a color conversion process in the xy chromaticity range of the XYZ color system according to the first embodiment.

FIG. 16 is an explanatory diagram for explaining an example of a color conversion process in the xy chromaticity range of the XYZ color system according to the first embodiment. In the first embodiment, the conversion process is described with an example, in which the input signal (for example, an RGB signal) is converted to the HSV space; however, as illustrated in FIG. 16, the process may be explained with use of the xy chromaticity range of the XYZ color system. In the xy chromaticity range of the XYZ color system illustrated in FIG. 16, a reference color gamut of the image display unit 30 and a white point WP indicating a white color of the image display unit 30 are illustrated.

In the color conversion method on an input signal supplied to the image display unit 30 as illustrated in FIG. 11, the conversion processing unit 10 receives the first input signal SRGB1 including the first color information that is obtained based on an input video signal and that is used for display at a predetermined pixel (Step S11). The first color information includes, for example, color information P11, color information P21, and color information P31 illustrated in FIG. 16.

The conversion processing unit 10, based on information in a look-up table defined such that saturation variation falls within a predetermined range according to each of the color information P11, the color information P21, and the color information P31, calculates conversion information AR1, conversion information AR2, and conversion information AR3 on orientations and distances with respect to the white point WP serving as a conversion target specified by the color information P11, the color information P21, the color information P31 within a predetermined range in which the amounts of saturation attenuation are regulated to $\Delta$SR1, $\Delta$SG1, and $\Delta$SB1, respectively.

The look-up table depends on a display color coordinate represented by, for example, the color information P11, the color information P21, and the color information P31, and also depends on the reference color gamut of the image display unit 30 and the white point WP of the image display unit 30. This is because, for example, the image display unit 30 is influenced by the ratio of each of the first sub-pixel 32R, the second sub-pixel 32G, the third sub-pixel 32B, and the fourth sub-pixel 32W with respect to the total or by a color generated by each of the sub-pixels.

The conversion processing unit 10 performs a saturation conversion step of converting saturations from the color information P11, the color information P21, and the color information P31 to color information P12, color information P22, and color information P32 that serve as the second color information, based on the conversion information AR1, the conversion information AR2, and the conversion information AR3, respectively (Step S12). The color information P11, the color information P21, and the color information P31 correspond to chromatic colors, as compared to the color information P12, the color information P22, and the color information P32 serving as the second color information, and are converted toward achromatic colors by being converted to the color information P12, the color information P22, and the color information P32, respectively.

Subsequently, as illustrated in FIG. 11, the conversion processing unit 10 performs a luminance adjustment step of performing a calculation to reduce a saturation such that the luminance of the first color information and the luminance of the second color information remain substantially equal to each other (Step S13). The level of each of the red component, the green component, and the blue component, each being a single color component, is uniformly reduced through the luminance adjustment step (Step S13). Therefore, through the RGBW signal processing step (Step S14), the amount of lighting of the red component (R) displayed by the first sub-pixel 32R and the amount of lighting of the additional color component such as the white component (W) displayed by the fourth sub-pixel 32W in the third input signal SRGBW are further reduced.

Then, the fourth sub-pixel signal processing unit 20 performs an output step of outputting, to the drive circuit 40 that controls drive of the image display unit 30, the third input signal SRGBW including the third color information with the red component (R), the green component (G), the blue component (B), and the additional color component such as the white component (W) that are converted based on the second color information in the second input signal SRGB2 (Step 15).

Figure 17:
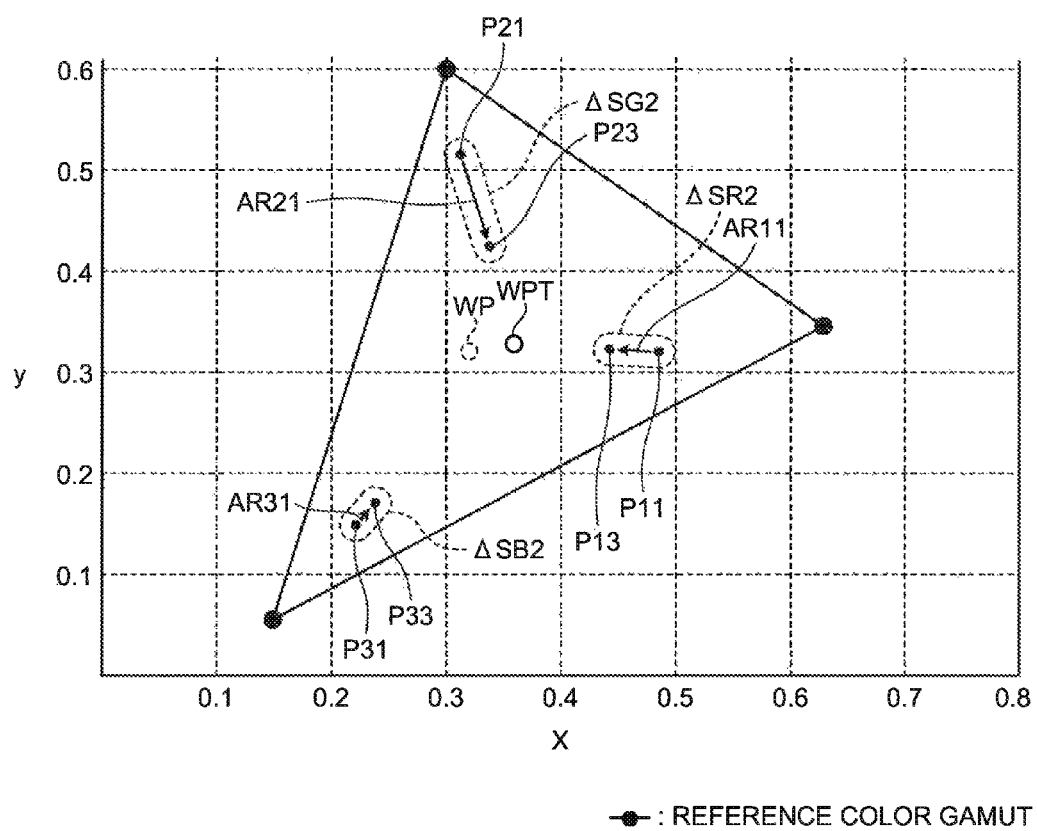
FIG. 17 is an explanatory diagram for explaining a modification of the color conversion process in the xy chromaticity range of the XYZ color system according to the first embodiment.

The conversion target specified by each of the color information P11, the color information P21, and the color information P31 is not limited to the white point WP. FIG. 17 is an explanatory diagram for explaining a modification of the color conversion process in the xy chromaticity range of the XYZ color system according to the first embodiment. When a target white point WPT represented by lighting the fourth sub-pixel 32W differs from the white point WP indicating the white color of the image display unit 30, the luminous efficiency of the fourth sub-pixel 32W may increase by employing the target white point WPT as the conversion target specified by each of the color information P11, the color information P21, and the color information P31. In this case, the conversion processing unit 10, based on information in a look-up table defined such that saturation variation falls within a predetermined range according to each of the color information P11, the color information P21, and the color information P31, calculates conversion information AR11, conversion information AR21, and conversion information AR31 on orientations and distances with respect to the target white point WPT serving as a conversion target specified by the color information P11, the color information P21, the color information P31 within a predetermined range in which the amounts of saturation attenuation are regulated to ΔSR2, ΔSG2, and ΔSB2, respectively. The conversion processing unit 10 performs a saturation conversion step of converting saturations from the color information P11, the color information P21, and the color information P31 to color information P13, color information P23, and color information P33 that serve as the second color information, based on the conversion information AR11, the conversion information AR21, and the conversion information AR31, respectively (Step S12). Subsequently, as illustrated in FIG. 11, the conversion processing unit 10 performs a luminance adjustment step of performing a calculation to reduce a saturation such that the luminance of the first color information and the luminance of the second color information remain substantially equal to each other (Step S13). The level of each of the red component, the green component, and the blue component, each being a single color component, is uniformly reduced through the luminance adjustment step (Step S13). Therefore, through the RGBW signal processing step (Step S14), the amount of lighting of the red component (R) displayed by the first sub-pixel 32R and the amount of lighting of the additional color component such as the white component (W) displayed by the fourth sub-pixel 32W in the third input signal SRGBW are further reduced.

Then, the fourth sub-pixel signal processing unit 20 performs an output step of outputting, to the drive circuit 40 that controls drive of the image display unit 30, the third input signal SRGBW including the third color information with the red component (R), the green component (G), the blue component (B), and the additional color component such as the white component (W) that are converted based on the second color information in the second input signal SRGB2 (Step S15).

If color information serving as the first color information is located between the white point WP and the target white point WPT, the total amount of lighting of the self-emitting elements obtained when the first color information is converted to the red component, the green component, the blue component, and the additional color component may become smaller than a total amount of lighting of the self-emitting elements, or a corresponding power value, obtained when the second color information is converted to the red component, the green component, the blue component, and the additional color component. Or, if color information serving as the first color information is converted to the second color information such that at least one of the hue and the saturation is converted to a different color coordinate, the total amount of lighting of the self-emitting elements obtained when the first color information is converted to the red component, the green component, the blue component, and the additional color component may become smaller than a total amount of lighting of the self-emitting elements, or a corresponding power value, obtained when the second color information is converted to the red component, the green component, the blue component, and the additional color component. If the total amount of lighting of the self-emitting elements obtained when the first color information is converted to the red component, the green component, the blue component, and the additional color component is smaller than a total amount of lighting of the self-emitting elements, or a corresponding power value, obtained when the second color information is converted to the red component, the green component, the blue component, and the additional color component, the conversion processing unit 10 outputs the first color information, as the second color information, to the fourth sub-pixel signal processing unit 20. In this manner, conversion of the first color information to the second color information that has a saturation reduced by the amount of saturation attenuation within the range of acceptable saturation variation includes use of information same as the first color information as the second color information. Consequently, it becomes possible to suppress the possibility that the power consumption of the pixel 31 may increase due to execution of the saturation conversion step (Step S12).

The target white point WPT is not limited to a color represented by lighting the fourth sub-pixel 32W. The target white point WPT may be a color represented by lighting all of the first sub-pixel 32R, the second sub-pixel 32G, the third sub-pixel 32B, and the fourth sub-pixel 32W, or may be a color represented by lighting all of the first sub-pixel 32R, the second sub-pixel 32G, and the third sub-pixel 32B.

Second Embodiment

Figure 18:
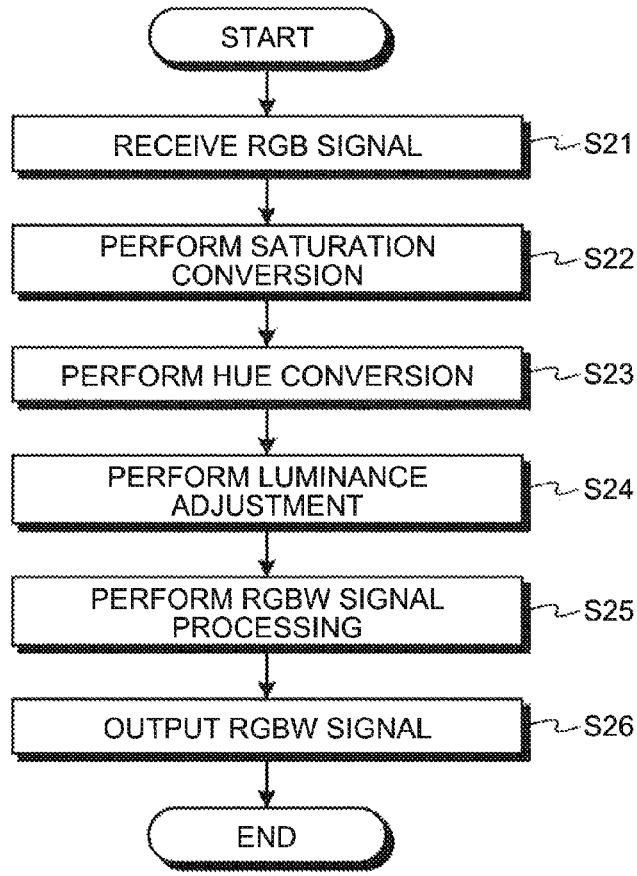
FIG. 18 is a flowchart for explaining a color conversion method according to a second embodiment.
Figure 19:
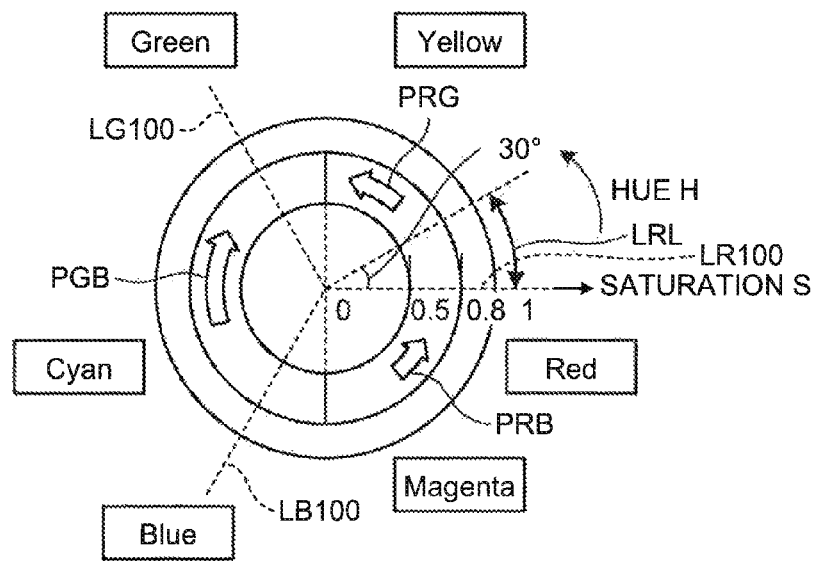
FIG. 19 is a conceptual diagram illustrating a hue conversion process in the HSV color space according to the second embodiment.
Figure 20:
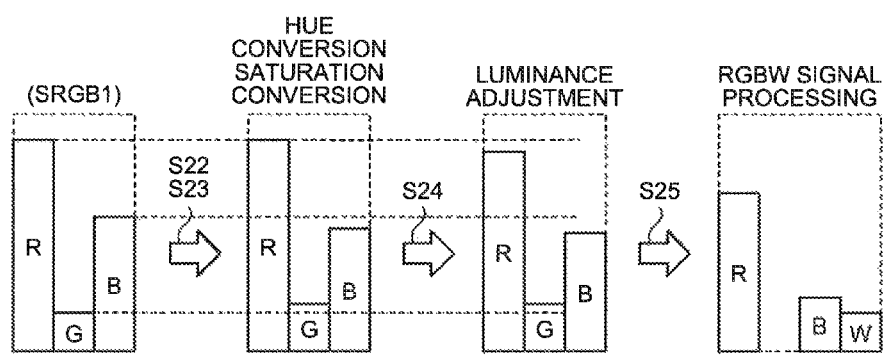
FIG. 20 is a schematic diagram for explaining an example of a color conversion process according to the second embodiment.
Figure 21:
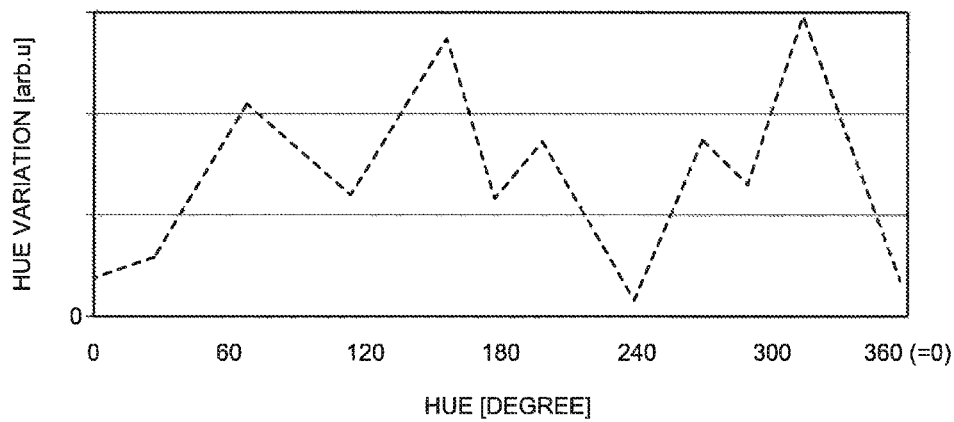
FIG. 21 is an explanatory diagram for explaining a look-up table indicating a relationship between an original hue before being converted according to the second embodiment and an amount of hue variation within a range of acceptable hue variation.

FIG. 18 is a flowchart for explaining a color conversion method according to a second embodiment. FIG. 19 is a conceptual diagram illustrating a hue conversion process in the HSV color space according to the second embodiment. FIG. 20 is a schematic diagram for explaining an example of a color conversion process according to the second embodiment. FIG. 21 is an explanatory diagram for explaining a look-up table indicating a relationship between an original hue before being converted according to the second embodiment and an amount of hue variation within a range of acceptable hue variation. The same components as those of the above described embodiment are denoted by the same reference numerals and symbols, and the same explanation will not be repeated.

As illustrated in FIG. 18, in the color conversion method on an input signal supplied to the image display unit 30, the conversion processing unit 10 receives the first input signal SRGB1 including the first color information that is obtained based on an input video signal and that is used for display at a predetermined pixel (Step S21). The first color information is subjected to gamma conversion as appropriate, and a value in the RGB coordinate system is converted to an input value in the HSV color space.

Subsequently, the conversion processing unit 10 performs a saturation conversion step based on the information in the look-up tables illustrated in FIG. 8 and FIG. 9, similarly to the above described Step S12 (Step S22).

As illustrated in FIG. 19, a region LRL with an angle from zero degree to 30 degrees (both inclusive) including a region LR100 placed at the angle of zero degree, as well as a region LB100 placed at the angle of 240 degrees are regions where the hue H can easily be recognized; therefore, it is preferable to set the amount of conversion of the hue H to a relatively small value. However, it has been found that, if the hue H at the angle of greater than 30 degrees and smaller than that of the region LG100 is shifted toward green (to approach the region LG100) by an amount of hue variation PRG, it becomes possible to suppress power consumption and improve luminous efficiency. It has also been found that, if the hue H between the region LG100 and the region LB100 (both not inclusive) is shifted toward green (to approach the region LG100) by an amount of hue variation PGB, it becomes possible to suppress power consumption and improve luminous efficiency. It has also been found that, if the hue H between the region LB100 and the region LR100 (both not inclusive) is shifted toward red (to approach the region LR100) by an amount of hue variation PRB, it becomes possible to suppress power consumption and improve luminous efficiency. Therefore, the conversion processing unit 10 according to the second embodiment stores therein information on the look-up table indicating the amount of hue variation with respect to the hue H as illustrated in FIG. 21, and calculates the amounts of the hue variation PRG, PGB, and PRB based on the look-up table illustrated in FIG. 21.

The conversion processing unit 10 according to the second embodiment performs, at Step S23, a hue conversion step of shifting the hue H of an original color by the amount of the hue variation PRG, PGB, or PRB or less within a range defined such that hue variation falls within a predetermined range such that the variation in the hue is less likely to be noticed and the total amount of lighting of the light-emitting elements of the first sub-pixel 32R, the second sub-pixel 32G, the third sub-pixel 32B, and the fourth sub-pixel 32W is reduced.

Subsequently, the conversion processing unit 10 performs a luminance adjustment step of performing a calculation to adjust a luminance such that the luminance of the first color information and the luminance of the second color information remain substantially equal to each other (Step S24). When a human being compares the first color information and the second color information, variation in the luminance is relatively small, so that degradation of the entire image is less likely to be recognized.

Subsequently, the fourth sub-pixel signal processing unit 20 performs the RGBW signal processing step of performing conversion to a reproduced value (the third input signal SRGBW) in the HSV color space reproduced with the first color, the second color, the third color, and the fourth color to generate an output signal, and outputting the generated output signal to the image display unit 30 (Step S25). Then, the fourth sub-pixel signal processing unit 20 performs an output step of outputting, to the drive circuit 40 that controls drive of the image display unit 30, the third input signal SRGBW including the third color information with the red component (R), the green component (G), the blue component (B), and the additional color component such as the white component (W) that are converted based on the second color information in the second input signal SRGB2 (Step S26). While an example of the color conversion method according to the second embodiment has been described, in which the saturation conversion step (Step S22) is first performed and the hue conversion step (Step S23) is subsequently performed, it may be possible to perform the saturation conversion step (Step S22) after the hue conversion step (Step S23). In the color conversion method according to the second embodiment, it may be possible to perform the hue conversion step (Step S23) and the saturation conversion step (Step S22) in parallel.

For example, according to the look-up table illustrated in FIG. 21, when the hue H is about 330 degrees, for example, in a region between the region LB100 and the region LR100 (both not inclusive), and if the hue H is shifted toward red (to approach the region LR100) by the amount of the hue variation PRB, it is possible to suppress power consumption and improve luminous efficiency. If the hue H of the first input signal SRGB1 (see FIG. 20) is shifted by the amount of the hue variation PGB, it is possible to suppress power consumption. The conversion processing unit 10 according to the second embodiment reduces a saturation by the amount of saturation attenuation within the range of acceptable saturation variation, and increases the amount of lighting of the light-emitting element of the second sub-pixel 32G. Therefore, as illustrated in FIG. 20, according to the conversion processing unit 10 of the second embodiment, the hue of the second color information is shifted toward a color with a higher luminance than the hue of the first color information. The conversion processing unit 10 shifts the hue H of an original color by the amount of the hue variation PRB or less within a range in which the variation in the hue is less likely to be noticed, to thereby reduce the amount of lighting of the light-emitting element of the third sub-pixel 32B. While the luminance of the converted hue H increases, the level of each of the red component, the green component, and the blue component, each being a single color component, is uniformly reduced through the luminance adjustment step (Step S24). Therefore, through the RGBW signal processing step (Step S25), the amount of lighting of the red component (R) displayed by the first sub-pixel 32R and the amount of lighting of the blue component (B) displayed by the third sub-pixel 32B in the third input signal SRGBW are further reduced.

The fourth sub-pixel 32W has a higher luminance or a higher power efficiency to display the additional color component (W) as compared to representation with the amount of lighting of the red component (R) displayed by the first sub-pixel 32R, the amount of lighting of the green component (G) displayed by the second sub-pixel 32G, and the amount of lighting of the blue component (B) displayed by the third sub-pixel 32B, so that power can further be saved.

As described above, the first sub-pixel 32R displays the red component according to the amount of lighting of the self-emitting element. The second sub-pixel 32G displays the green component according to the amount of lighting of the self-emitting element. The third sub-pixel 32B displays the blue component according to the amount of lighting of the self-emitting element. The fourth sub-pixel 32W has a higher luminance or a higher power efficiency to display the additional color component such as the white component (W) as compared to representation with the amount of lighting of the red component (R) displayed by the first sub-pixel 32R, the amount of lighting of the green component (G) displayed by the second sub-pixel 32G, and the amount of lighting of the blue component (B) displayed by the third sub-pixel 32B, and displays the additional color component according to the amount of lighting of the self-emitting element. The hue of the second color information is shifted in a direction in which the number of lightings of the self-emitting elements of the first sub-pixel 32R, the second sub-pixel 32G, and the third sub-pixel 32B decreases such that the amount of lighting of the self-emitting element of at least one of the first sub-pixel 32R, the second sub-pixel 32G, and the third sub-pixel 32B decreases as compared to the hue of the first color information. In the color conversion method according to the second embodiment, the hue conversion is performed such that the hue of the second color information is shifted within the range of acceptable hue variation, relative to the hue of the first color information. Therefore, the total amount of lighting of the light-emitting elements of the first sub-pixel 32R, the second sub-pixel 32G, the third sub-pixel 32B, and the fourth sub-pixel 32W can be reduced.

According to the embodiment, it is possible to provide a display device and a color conversion method capable of suppressing power consumption in an image display unit that lights self-emitting elements.

Third Embodiment

Figure 22:
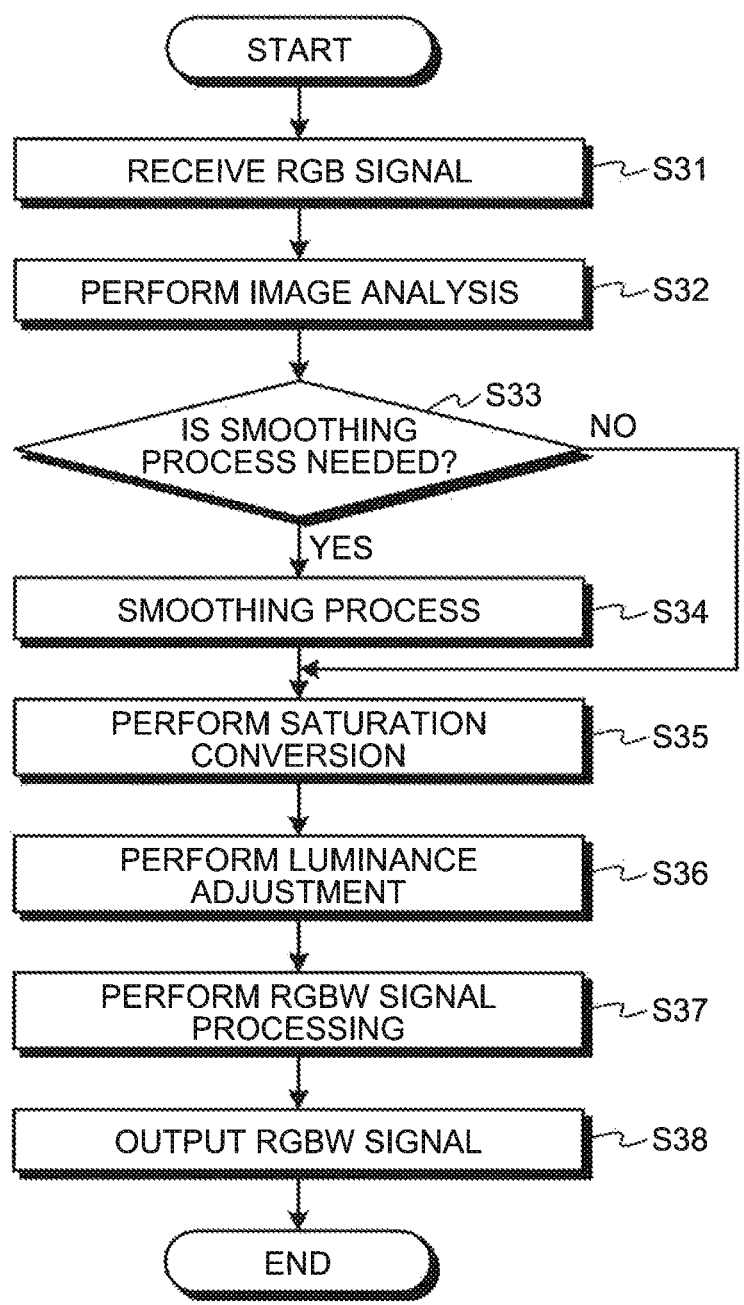
FIG. 22 is a flowchart for explaining a color conversion method according to a third embodiment.
Figure 23:
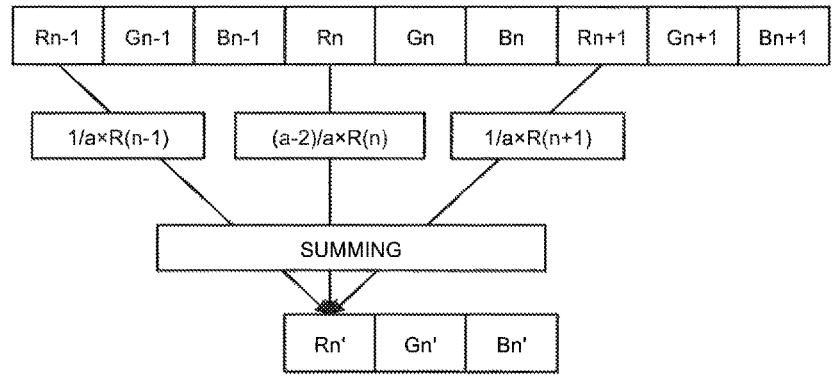
FIG. 23 is a flowchart for explaining a smoothing processing step according to the third embodiment.
Figure 24:
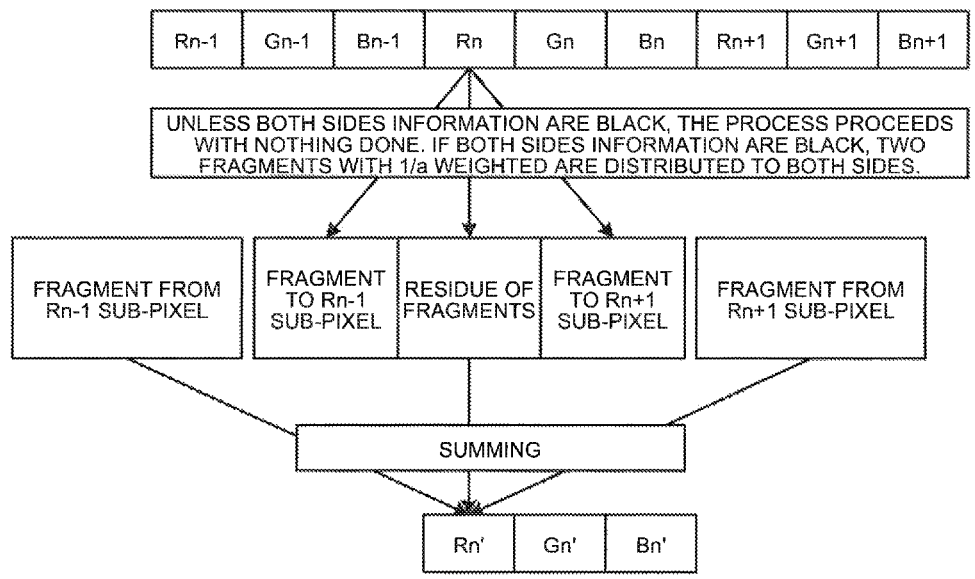
FIG. 24 is a flowchart for explaining a modification of the smoothing processing step according to the third embodiment.

FIG. 22 is a flowchart for explaining a color conversion method according to the third embodiment. FIG. 23 is a flowchart for explaining a smoothing processing step according to the third embodiment. FIG. 24 is a flowchart for explaining a modification of the smoothing processing step according to the third embodiment. The same components as those of the above described embodiments are denoted by the same reference numerals and symbols, and the same explanation will not be repeated.

When an image, such as a binary dither image or a brush effect image, in which colors are represented with composite colors generated by using the adjacent pixels 31 like the sub-pixels 32, is input as an input video signal, and if, for example, a hue with a saturation to be greatly varied, that is, a hue near a green color, is displayed, the saturation S decreases according to the color conversion method of the first and the second embodiments as described above; therefore, the composite colors may be shifted from original colors expected to be displayed.

As illustrated in FIG. 22, in the color conversion method on an input signal supplied to the image display unit 30, the conversion processing unit 10 receives the first input signal SRGB1 including the first color information that is obtained based on an input video signal and that is used for display at a predetermined pixel (Step S31). The first color information is subjected to gamma conversion as appropriate, and a value in the RGB coordinate system is converted to an input value in the HSV color space.

Subsequently, at an image analysis step (Step S32), the conversion processing unit 10 performs an image analysis on the input video signal. Alternatively, at the image analysis step at Step S32, the conversion processing unit 10 acquires image analysis information on the input video signal, which is calculated through other processes. As a result of the image analysis on the input video signal, if the image is not an image such as a binary dither image or a brush effect image in which a single color is represented with the adjacent pixels 31, and a smoothing process is not needed (NO at Step S33), the conversion processing unit 10 proceeds to Step S35. The process from Step S35 to Step S38 is the same as the process from Step S12 to Step S15 of the first embodiment, and therefore, explanation thereof will be omitted. The smoothing process may be performed in every case. In this case, the image analysis step (Step S32) may be omitted.

As a result of the image analysis on the input video signal, if the image is an image such as a binary dither image or a brush effect image in which a single color is represented with the adjacent pixels 31, and the smoothing process is needed (YES at Step S33), the conversion processing unit 10 proceeds to Step S34.

As the smoothing process, the conversion processing unit 10 replaces a piece of the first color information used for display at a predetermined pixel with an average value of the piece of the first color information used for display at the predetermined pixel and pieces of the first color information used for display at pixels adjacent to the predetermined pixel (Step S34). For example, as illustrated in FIG. 23, the conversion processing unit 10 performs, as the smoothing process, an averaging process of replacing red component information Rn, which is contained in the piece of the first color information used for display at a predetermined pixel, with an average of the red component information Rn, red component information Rn−1, and red component information Rn+1, where each of the red component information Rn−1 and the red component information Rn+1 is multiplied by a weight of 1/a and contained in a piece of the first color information used for display at a pixel adjacent to the predetermined pixel.

The conversion processing unit 10 replaces, as the smoothing process, a piece of the first color information used for display at a predetermined pixel with an average value of the piece of the first color information used for display at the predetermined pixel and pieces of the first color information used for display at pixels adjacent to the predetermined pixel (Step S34). For example, as illustrated in FIG. 23, the conversion processing unit 10 performs, as the smoothing process, an averaging process on a sum of the red component information Rn, which is multiplied by a predetermined weight of (a−2)/a and contained in a piece of the first color information used for display at a predetermined pixel, and the red component information Rn−1 and the red component information Rn+1, each of which is multiplied by a predetermined weight of 1/a and contained in a piece of the first color information used for display at a pixel adjacent to the predetermined pixel. Similarly, the conversion processing unit 10 performs the smoothing process on green component information Gn contained in the piece of the first color information used for display at the predetermined pixel. Further, the conversion processing unit 10 performs the smoothing process on blue component information Bn contained in the piece of the first color information used for display at the predetermined pixel. Consequently, even when an image such as a binary dither image or a brush effect image in which a single color is represented with the adjacent pixels 31 is input as an input video signal, it is possible to suppress degradation in the entire image quality.

For another example, as illustrated in FIG. 24, if the pieces of the first color information used for display at the pixels on the both sides of the predetermined pixel are other than information on black, the conversion processing unit 10 does not perform, as the smoothing process, any process on the red component information Rn contained in the piece of the first color information used for display at the predetermined pixel, and proceeds to Step S34. If the pieces of the first color information used for display at the pixels on the both sides of the predetermined pixel correspond to information on black, the conversion processing unit 10 performs a process of, as the smoothing process, allocating, to the both sides, fragments corresponding to a predetermined weight of 1/a of the red component information Rn contained in the piece of the first color information used for display at the predetermined pixel. The conversion processing unit 10 performs a calculation such that R'=1/a×R(n−1)+((a−2)/a)×R(n)+1/a×R(n+1). Consequently, it becomes possible to suppress blurring of the image of the input video signal.

Fourth Embodiment

Figure 25:
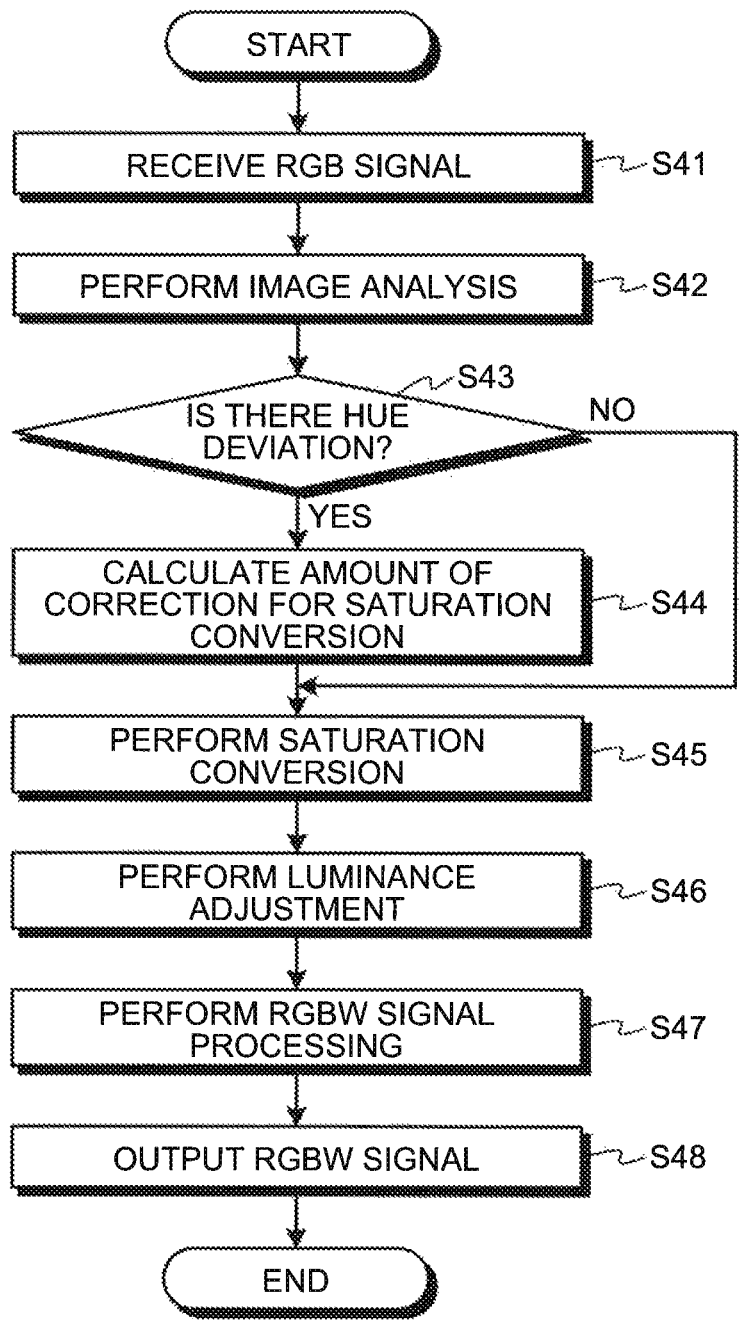
FIG. 25 is a flowchart for explaining a color conversion method according to a fourth embodiment.

FIG. 25 is a flowchart for explaining a color conversion method according to a fourth embodiment. The same components as those of the above described embodiments are denoted by the same reference numerals and symbols, and the same explanation will not be repeated.

If an image with a hue deviation over the entire image is input as an input video signal, the saturation S of a green component for example decreases through the color conversion method on an input signal supplied to the image display unit according to the above described first and second embodiments; therefore, the entire image quality may be degraded.

Therefore, as illustrated in FIG. 25, in a color conversion method on an input signal supplied to the image display unit according to the fourth embodiment, the conversion processing unit 10 receives the first input signal SRGB1 including the first color information that is obtained based on an input video signal and that is used for display at a predetermined pixel (Step S41). The first color information is subjected to gamma conversion as appropriate, and a value in the RGB coordinate system is converted to an input value in the HSV color space.

Subsequently, at an image analysis step at Step S42, the conversion processing unit 10 performs an image analysis on the input video signal. Alternatively, at the image analysis step at Step S42, the conversion processing unit 10 acquires image analysis information on the input video signal, which is calculated through other processes. As a result of the image analysis on the input video signal, if there is a hue deviation over the entire image and the deviation is not above a predetermined threshold (NO at Step S43), the conversion processing unit 10 proceeds to Step S45. The process from Step S45 to Step S48 is the same as the process from Step S12 to Step S15 of the first embodiment, and therefore, explanation thereof will be omitted.

As a result of the image analysis on the input video signal, if there is a hue deviation over the entire image and the deviation is above the predetermined threshold (YES at Step S43), the conversion processing unit 10 proceeds to Step S44.

The conversion processing unit 10 obtains a centroid of average chromaticity of the hue of the entire image. The conversion processing unit 10 calculates an amount of correction for use in the saturation conversion on the basis of the amount of shift of the centroid of the average chromaticity, and stores the amount of correction (Step S44). Subsequently, as illustrated in FIG. 10, the conversion processing unit 10 performs the saturation conversion step of calculating, based on the information in the look-up tables in FIG. 8 and FIG. 9, a gain value of the amount of saturation attenuation such that the amount of saturation attenuation is regulated to any of the amounts of the saturation attenuation ΔSR, ΔSG, and ΔSB defined such that saturation variation falls within a predetermined range according to each hue H and each original saturation S and such that the amount of correction obtained at Step S44 is subtracted, and multiplying the first color information that is the input value in the HSV color space by the gain value (Step S45).

As described above, when there is a hue deviation in pieces of the first color information used for display at all of pixels according to an image analysis on the input video signal, the conversion processing unit 10 according to the fourth embodiment adds the amount of correction based on the centroid of the hue deviation to the first color information used for display at a predetermined pixel, and thereafter performs conversion to the second color information. Therefore, when there is a hue deviation over the entire image, the amount of saturation attenuation is reduced and degradation of an image is less likely to be recognized by a human being.

Fifth Embodiment

Figure 26:
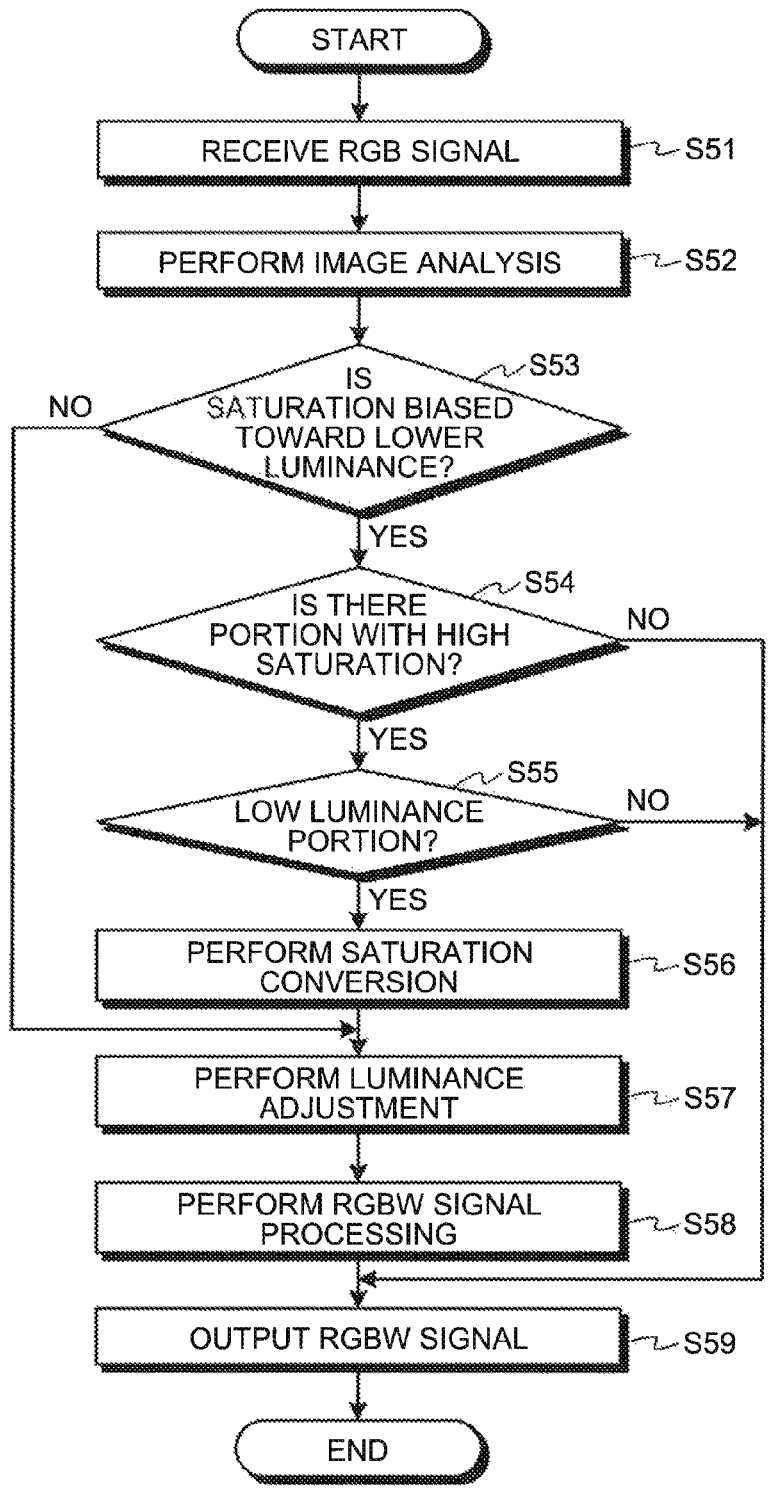
FIG. 26 is diagram flowchart for explaining a color conversion method according to a fifth embodiment.
Figure 27:
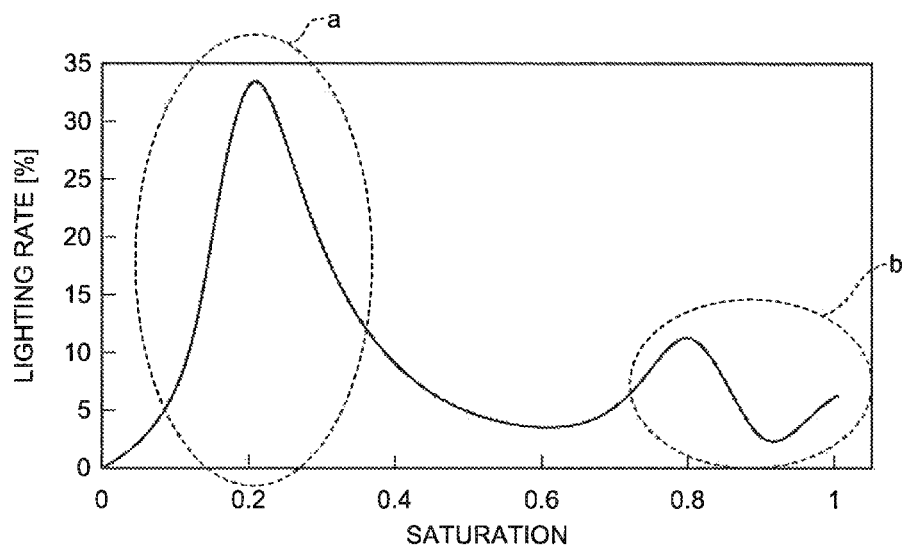
FIG. 27 is an explanatory diagram for explaining an exemplary image analyzed according to the fifth embodiment.
Figure 28:
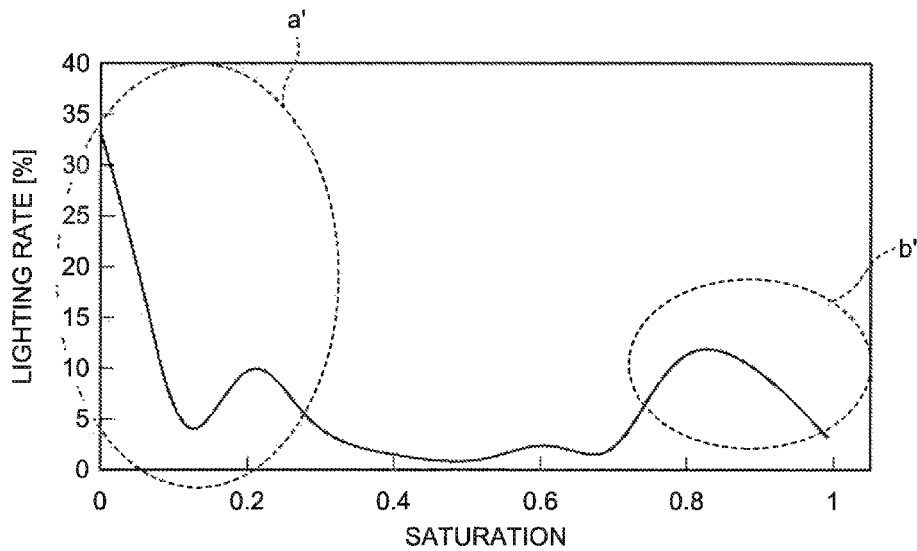
FIG. 28 is an explanatory diagram for explaining another exemplary image analyzed according to the fifth embodiment.

FIG. 26 is a flowchart for explaining a color conversion method according to a fifth embodiment. FIG. 27 is an explanatory diagram for explaining an exemplary image analyzed according to the fifth embodiment. FIG. 28 is an explanatory diagram for explaining another exemplary image analyzed according to the fifth embodiment. The same components as those of the above described embodiments are denoted by the same reference numerals and symbols, and the same explanation will not be repeated.

If an image with a deviation of an average saturation over the entire image is input as an input video signal, the saturation S of a green component for example decreases through the color conversion method on the input signal supplied to the image display unit according to the above described first and second embodiments; therefore, the entire image quality may be degraded. For example, an image of cloudy sky or the like has only low saturations, so that the image may look faded after being subjected to conversion.

Therefore, as illustrated in FIG. 26, in the color conversion method on an input signal supplied to the image display unit according to the fifth embodiment, the conversion processing unit 10 receives the first input signal SRGB1 including the first color information that is obtained based on an input video signal and that is used for display at a predetermined pixel (Step S51). The first color information is subjected to gamma conversion as appropriate, and a value in the RGB coordinate system is converted to an input value in the HSV color space.

Subsequently, at an image analysis step at Step S52, the conversion processing unit 10 performs an image analysis on the input video signal. Alternatively, at the image analysis step at Step S52, the conversion processing unit 10 acquires image analysis information on the input video signal, which is calculated through other processes. As a result of the image analysis on the input video signal, if the deviation of the average saturation over the entire image is not above a predetermined threshold and the saturation is not deviated toward a lower luminance (NO at Step S53), the conversion processing unit 10 proceeds to Step S56. The process from Step S56 to Step S59 is the same as the process from Step S12 to Step S15 of the first embodiment, and therefore, explanation thereof will be omitted.

If the deviation of the average saturation over the entire image is above the predetermined threshold and the saturation is deviated toward a lower luminance (YES at Step S53), the conversion processing unit 10 proceeds to Step S54. If there is no portion with a relatively high saturation as illustrated in FIG. 27 and FIG. 28 within the entire image (NO at Step S54), the conversion processing unit 10 proceeds to Step S58. Therefore, an image of cloudy sky or the like is treated as an image with only low saturations, and is not subjected to the saturation conversion step (Step S56).

Even if the saturation conversion step (Step S56) is not performed, influence on the power consumption is relatively small because the saturations are originally low, and it is also possible to suppress degradation of the image.

If there is a portion with a relatively high saturation within the entire image (YES at Step S54), the conversion processing unit 10 proceeds to Step S55. If the first color information input through an RGB input process (Step S51) corresponds to a low luminance portion (YES at Step S51), the conversion processing unit 10 proceeds to Step S56. If the first color information input through the RGB input process (Step S55) does not correspond to a low luminance portion, the conversion processing unit 10 proceeds to Step S58.

As described above, when there is a hue deviation in pieces of the first color information used for display at all of pixels according to an image analysis on the input video signal, the conversion processing unit 10 according to the fifth embodiment adds the amount of correction based on the centroid of the hue deviation to the first color information used for display at a predetermined pixel, and thereafter performs conversion to the second color information. Therefore, when there is a hue deviation over the entire image, the amount of saturation attenuation is reduced and degradation of an image is less likely to be recognized by a human being.

The conversion processing unit 10 may obtain the amount of correction to be added to the first color information on the basis of information on a value. The conversion processing unit 10 has a function to adjust the amount of saturation attenuation on the basis of the value. For example, it is not necessary to convert a saturation of data with a relatively low (dark) value because power consumption for the data is originally small, and data with a relatively high value is selected as a target of conversion. The conversion processing unit 10 multiplies the final amount of correction for use in the saturation conversion by a weight that is obtained by multiplying the function of the value by a saturation calculated from the hue H and the saturation S.

Application Examples

With reference to FIG. 29 to FIG. 37, application examples of the display device 100 described in the first to the fifth embodiments and the modifications will be described below. In the following, the first to the fifth embodiments and the modifications are collectively referred to as an embodiment. FIG. 29 to FIG. 37 are diagrams illustrating exemplary electronic apparatuses to which the display device according to the embodiment is applied. The display device 100 according to the embodiment may be applied to an electronic apparatus in various fields, such as a mobile phone, a portable terminal device including a smartphone or the like, a television device, a digital camera, a laptop personal computer, a video camera, or a meter provided in a vehicle. In other words, the display device 100 according to the embodiment may be applied to an electronic apparatus in various fields to display, as an image or video, a video signal input from an external apparatus or a video signal generated inside thereof. The electronic apparatus includes a control device that supplies a video signal to the display device 100 and controls operation of the display device 100.

Application Example 1

Figure 29:
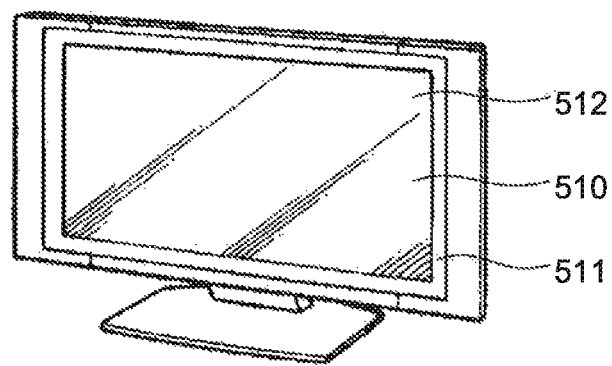
FIG. 29 is a diagram illustrating an exemplary electronic apparatus to which the display device according to the embodiment is applied.

FIG. 29 illustrates a television device, as an electronic apparatus, to which the display device 100 according to the embodiment is applied. The television device includes, for example, a video display screen unit 510 including a front panel 511 and a filter glass 512. The video display screen unit 510 corresponds to the display device 100 according to the embodiment.

Application Example 2

Figure 30:
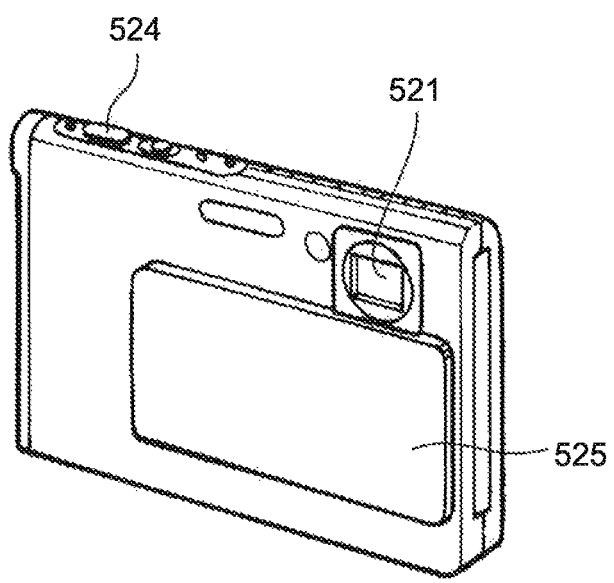
FIG. 30 is a diagram illustrating an exemplary electronic apparatus to which the display device according to the embodiment is applied.
Figure 31:
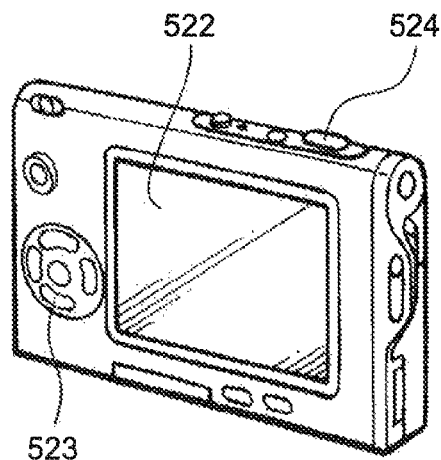
FIG. 31 is a diagram illustrating an exemplary electronic apparatus to which the display device according to the embodiment is applied.

FIG. 30 and FIG. 31 illustrate a digital camera, as an electronic apparatus, to which the display device 100 according to the embodiment is applied. The digital camera includes, for example, a light-emitting unit 521 for flash, a display unit 522, a menu switch 523, and a shutter button 524. The display unit 522 corresponds to the display device 100 according to the embodiment. As illustrated in FIG. 30, the digital camera includes a lens cover 525, and an imaging lens appears when the lens cover 525 is slid. The digital camera can capture digital pictures by receiving incident light through the imaging lens.

Application Example 3

Figure 32:
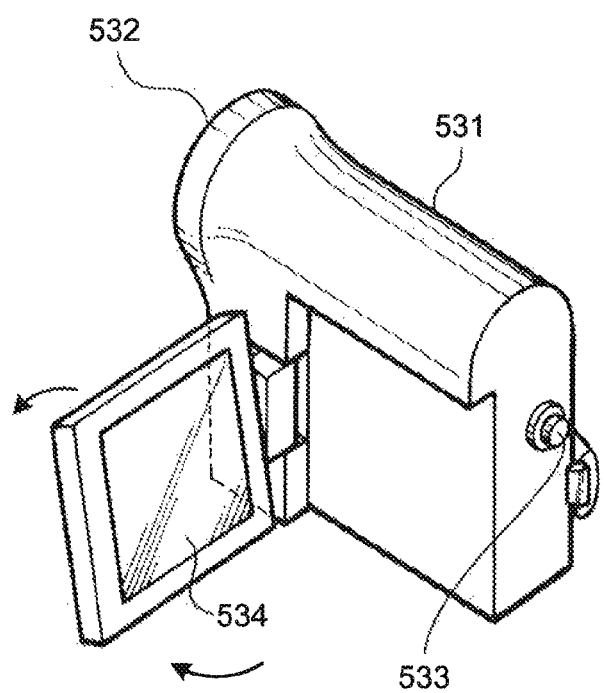
FIG. 32 is a diagram illustrating an exemplary electronic apparatus to which the display device according to the embodiment is applied.

FIG. 32 illustrates an exterior of a video camera, as an electronic apparatus, to which the display device 100 according to the embodiment is applied. The video camera includes, for example, a body 531, a subject imaging lens 532 provided on a front surface of the body 531, a start/stop switch 533 for imaging, and a display unit 534. The display unit 534 corresponds to the display device 100 according to the embodiment.

Application Example 4

Figure 33:
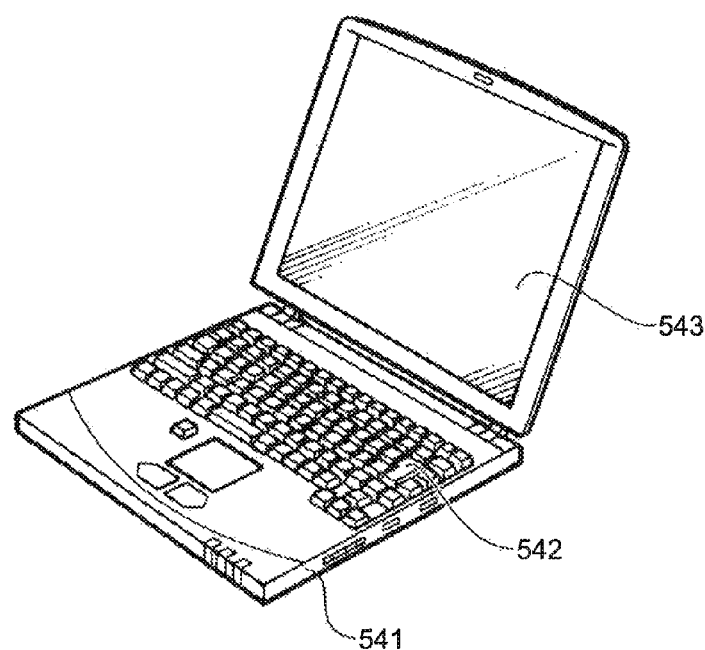
FIG. 33 is a diagram illustrating an exemplary electronic apparatus to which the display device according to the embodiment is applied.

FIG. 33 illustrates a laptop personal computer, as an electronic apparatus, to which the display device 100 according to the embodiment is applied. The laptop personal computer includes, for example, a body 541, a keyboard 542 for inputting text or the like, and a display unit 543 for displaying images. The display unit 543 corresponds to the display device 100 according to the embodiment.

Application Example 5

Figure 34:
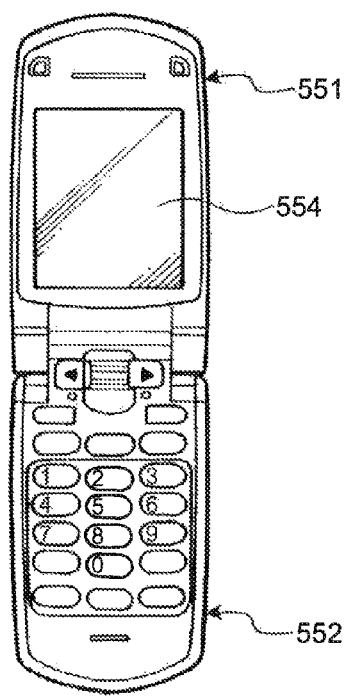
FIG. 34 is a diagram illustrating an exemplary electronic apparatus to which the display device according to the embodiment is applied.
Figure 35:
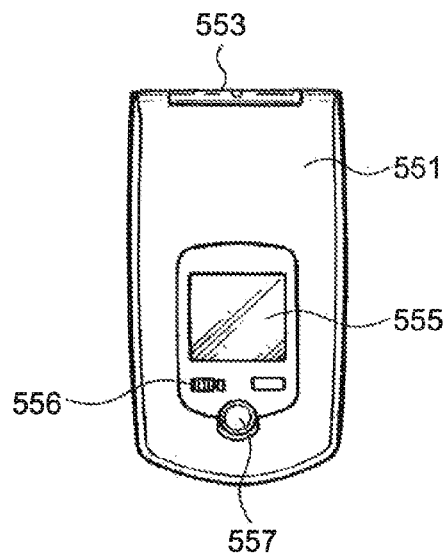
FIG. 35 is a diagram illustrating an exemplary electronic apparatus to which the display device according to the embodiment is applied.

FIG. 34 and FIG. 35 illustrate a mobile phone, as an electronic apparatus, to which the display device 100 is applied. FIG. 34 is a front view of the mobile phone in an opened state. FIG. 35 is a front view of the mobile phone in a folded state. The mobile phone includes, for example, an upper case 551 and a lower case 552 that are joined by a connecting part (hinge) 553, and also includes a display 554, a sub-display 555, a picture light 556, and a camera 557. The display device 100 is mounted on the display 554. Therefore, the display 554 of the mobile phone may have a function to detect touch operation, in addition to a function to display images.

Application Example 6

Figure 36:
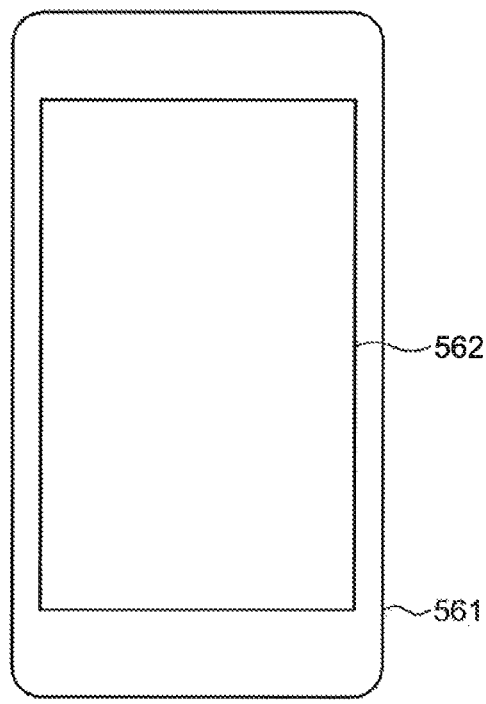
FIG. 36 is a diagram illustrating an exemplary electronic apparatus to which the display device according to the embodiment is applied.

FIG. 36 illustrates an information portable terminal, as an electronic apparatus, that operates as a portable computer, a mobile phone with a plurality of functions, a portable computer capable of performing a telephone call, or a portable computer capable of performing communication, and that may be called as a smartphone or a tablet terminal. The information portable terminal includes, for example, a display unit 562 on a surface of a case 561. The display unit 562 corresponds to the display device 100 according to the embodiment.

Application Example 7

Figure 37:
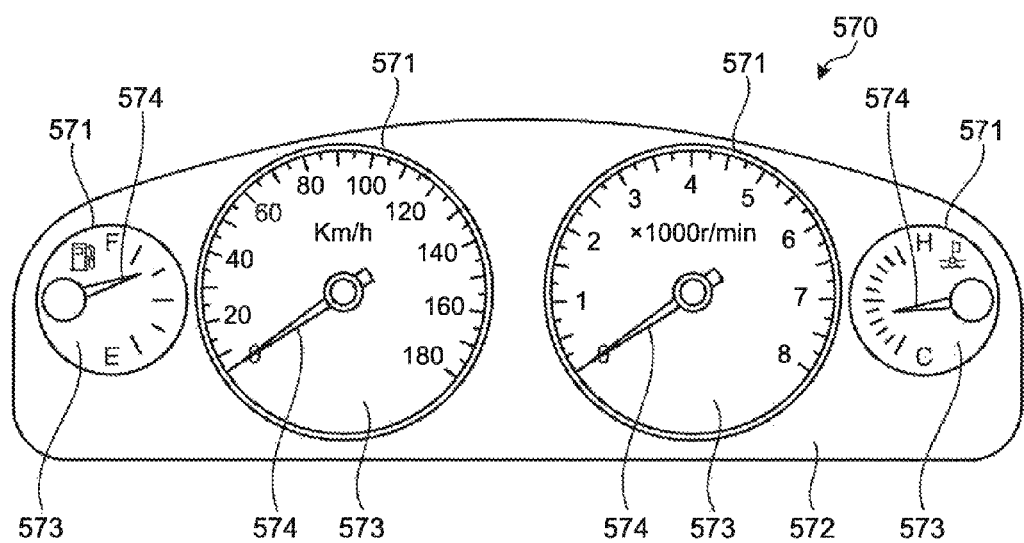
FIG. 37 is a diagram illustrating an exemplary electronic apparatus to which the display device according to the embodiment is applied.

FIG. 37 is a schematic configuration diagram of a meter unit that serves as an electronic apparatus according to the embodiment and which is mounted on a vehicle. A meter unit (the electronic apparatus) 570 illustrated in FIG. 37 includes a plurality of display devices 571, each of which corresponds to the display device 100 according to the embodiment and serves as a fuel meter, a water temperature meter, a speed meter, or a tachometer. The display devices 571 are covered by a single outer panel 572.

Each of the display devices 571 illustrated in FIG. 37 includes a combination of a panel 573 serving as a display means and a movement mechanism serving as an analog display means. The movement mechanism includes a motor serving as a driving means and a pointer 574 rotated by the motor. As illustrated in FIG. 37, in each of the display devices 571, a scale, a warning, and the like can be displayed on a display surface of the panel 573, and the pointer 574 of the movement mechanism can rotate on the display surface side of the panel 573.

In FIG. 37, the display devices 571 are provided on the single outer panel 572; however, the embodiment is not thus limited. It may be possible to provide the single display device 571 in a region surrounded by the outer panel 572, and display a fuel meter, a water temperature meter, a speed meter, a tachometer, and the like on the display device.

What is claimed is:

1. A display device comprising:
   an image display unit including a plurality of pixels including a first pixel, a second pixel arrayed next to the first pixel, and a third pixel arrayed next to the first pixel, the first pixel interposed between the second pixel and the third pixel, each of the plurality of pixels including:
      a first sub-pixel for displaying a red component according to an amount of lighting of a self-emitting element;
      a second sub-pixel for displaying a green component according to an amount of lighting of a self-emitting element;
      a third sub-pixel for displaying a blue component according to an amount of lighting of a self-emitting element; and
      a fourth sub-pixel for displaying an additional color component different from the respective components of the first sub-pixel, the second sub-pixel, and the third sub-pixel according to an amount of lighting of a self-emitting element, and having a higher luminance or a higher power efficiency to display the additional color component as compared to representation with the first sub-pixel, the second sub-pixel, and the third sub-pixel;
   a conversion processing unit configured to:
      receive a first input signal including first color information on the red component, the green component, and the blue component for display at a predetermined pixel of the plurality of pixels and is obtained based on an input video signal,
      perform a smoothing process including a calculation to obtain a sum R(n') of red component information R(n), which is multiplied by a predetermined weight of (a−2)/a and contained in a piece of the first color information used for display at the first pixel, red component information R(n−1), which is multiplied by a predetermined weight of 1/a and contained in a piece of the first color information used for display at the second pixel, and red component information R(n+1), which is multiplied by the predetermined weight of 1/a and contained in a piece of the first color information used for display at the third pixel, the calculation being expressed as R(n')=1/a×R(n−1)+((a−2)/a)×R(n)+1/a×R(n+1) where n and a are natural numbers excluding zero, to replace the piece of the first color information used for display at the first pixel with the sum R(n'),
      convert a saturation of the first color information into a saturation of second color information on the red component, the green component, and the blue component, in which the saturation of the first color information is reduced by an amount of saturation attenuation defined such that saturation variation falls within a predetermined range according to the first color information,
      output a second input signal including the second color information; and
   a fourth sub-pixel signal processing unit configured to output, to a drive circuit that drives the image display unit, a third input signal including third color information on the red component, the green component, the blue component, and the additional color component that are converted based on the second color information in the second input signal,
   wherein the conversion processing unit converts the saturation of the first color information into the saturation of the second color information such that a color having the saturation of the second color information is shifted toward a color with a greater amount of the additional color component as compared to a color having the saturation of the first color information, and
   the conversion processing unit performs a calculation to reduce a saturation such that a luminance of the first color information and a luminance of the second color information remain substantially equal to each other.

2. The display device according to claim 1, wherein if a total amount of lighting of the self-emitting elements obtained when the first color information is converted to the red component, the green component, the blue component, and the additional color component is smaller than a total amount of lighting of the self-emitting elements obtained when the second color information is converted to the red component, the green component, the blue component, and the additional color component, the conversion processing unit outputs the first color information as the second color information to the fourth sub-pixel signal processing unit.

3. The display device according to claim 1, wherein the conversion processing unit performs a calculation to reduce a saturation such that the amount of saturation attenuation varies according to a hue of the first color information.

4. The display device according to claim 3, wherein the conversion processing unit performs a calculation to reduce a saturation by increasing the amount of saturation attenuation with a decrease in the saturation of the first color information.

5. The display device according to claim 1, wherein the additional color component serves as a main component among color components to be lighted by the respective self-emitting elements that light the first sub-pixel, the second sub-pixel, the third sub-pixel, and the fourth sub-pixel, and
   a color conversion layer is provided for each of the first sub-pixel, the second sub-pixel, and the third sub-pixel to convert the additional color component to each of the red component, the green component, and the blue component.

6. The display device according to claim 1, wherein performing the smoothing process further includes a calculation to obtain a sum G(n') of green component information G(n), which is multiplied by a predetermined weight of (a−2)/a and contained in a piece of the first color information used for display at the first pixel, green component information G(n−1), which is multiplied by a predetermined weight of 1/a and contained in a piece of the first color information used for display at the second pixel, and green component information G(n+1), which is multiplied by the predetermined weight of 1/a and contained in a piece of the first color information used for display at the third pixel, the calculation being expressed as G(n')=1/a×G(n−1)+((a−2)/a)×G(n)+1/a×G(n+1) where n and a are natural numbers excluding zero, to replace the piece of the first color information used for display at the first pixel with the sum G(n').

7. The display device according to claim 6, wherein performing the smoothing process further includes a calculation to obtain a sum B(n') of blue component information B(n), which is multiplied by a predetermined weight of (a−2)/a and contained in a piece of the first color information used for display at the first pixel, blue component information B(n−1), which is multiplied by a predetermined weight of 1/a and contained in a piece of the first color information used for display at the second pixel, and blue component information B(n+1), which is multiplied by the predetermined weight of 1/a and contained in a piece of the first color information used for display at the third pixel, the calculation being expressed as B(n')=1/a×B(n−1)+((a−2)/a)×B(n)+1/a×B(n+1) where n and a are natural numbers excluding zero, to replace the piece of the first color information used for display at the first pixel with the sum B(n').

8. A color conversion method on an input signal supplied to a drive circuit of an image display unit, the image display unit including a plurality of pixels including a first pixel, a second pixel arrayed next to the first pixel, and a third pixel arrayed next to the first pixel, the first pixel interposed between the second pixel and the third pixel, each of the plurality of pixels including:
a first sub-pixel for displaying a red component according to an amount of lighting of a self-emitting element;
a second sub-pixel for displaying a green component according to an amount of lighting of a self-emitting element;
a third sub-pixel for displaying a blue component according to an amount of lighting of a self-emitting element; and
a fourth sub-pixel for displaying an additional color component different from the respective components of the first sub-pixel, the second sub-pixel, and the third sub-pixel according to an amount of lighting of a self-emitting element, and having a higher luminance or a higher power efficiency to display the additional color component as compared to representation with the first sub-pixel, the second sub-pixel, and the third sub-pixel,
the color conversion method comprising:
receiving a first input signal including first color information on the red component, the green component, and the blue component for display at a predetermined pixel of the plurality of pixels, and is obtained based on an input video signal;
performing an image analysis on the input video signal, and if an image is a binary dither image or a brush effect image in which a single color is represented with adjacent pixels as a result of the image analysis, then performing a smoothing process including a calculation to obtain a sum R(n') of red component information R(n), which is multiplied by a predetermined weight of (a−2)/a and contained in a piece of the first color information used for display at the first pixel, red component information R(n−1), which is multiplied by a predetermined weight of 1/a and contained in a piece of the first color information used for display at the second pixel, and red component information R(n+1), which is multiplied by the predetermined weight of 1/a and contained in a piece of the first color information used for display at a pixel adjacent to the third pixel, the calculation being expressed as R(n')=1/a×R(n−1)+((a−2)/a)×R(n)+1/a×R(n+1) where n and a are natural numbers excluding zero, to replace the piece of the first color information used for display at the first pixel with the sum R(n');
converting a saturation of the first color information into a saturation of second color information on the red component, the green component, and the blue component, in which the saturation of the first color information is reduced by an amount of saturation attenuation defined such that saturation variation falls within a predetermined range according to the first color information;
outputting a second input signal including the second color information;
performing a calculation to reduce a saturation such that a luminance of the first color information and a luminance of the second color information remain substantially equal to each other; and
outputting, to the image display unit, a third input signal including third color information on the red component, the green component, the blue component, and the additional color component that are converted based on the second color information in the second input signal,
wherein converting the saturation of the first color information is performed such that a color having the saturation of the second color information is shifted toward a color with a greater amount of the additional color component as compared to a color having the saturation of the first color information.

9. The color conversion method according to claim 8, wherein performing the smoothing process further includes a calculation to obtain a sum G(n') of green component information G(n), which is multiplied by a predetermined weight of (a−2)/a and contained in a piece of the first color information used for display at the first pixel, green component information G(n−1), which is multiplied by a predetermined weight of 1/a and contained in a piece of the first color information used for display at the second pixel, and green component information G(n+1), which is multiplied by the predetermined weight of 1/a and contained in a piece of the first color information used for display at the third pixel, the calculation being expressed as G(n')=1/a×G(n−1)+((a−2)/a)×G(n)+1/a×G(n+1) where n and a are natural numbers excluding zero, to replace the piece of the first color information used for display at the first pixel with the sum G(n').

10. The color conversion method according to claim 8, wherein performing the smoothing process further includes a calculation to obtain a sum B(n') of blue component information B(n), which is multiplied by a predetermined weight of (a−2)/a and contained in a piece of the first color information used for display at the first pixel, blue component information $B(n-1)$, which is multiplied by a predetermined weight of $1/a$ and contained in a piece of the first color information used for display at the second pixel, and blue component information $B(n+1)$, which is multiplied by the predetermined weight of $1/a$ and contained in a piece of the first color information used for display at the third pixel, the calculation being expressed as $B(n')=1/a \times B(n-1)+((a-2/a) \times B(n)+1/a \times B(n+1)$ where n and a are natural numbers excluding zero, to replace the piece of the first color information used for display at the first pixel with the sum $B(n')$.

* * * * *